(12) United States Patent
Cheng et al.

(10) Patent No.: US 11,186,502 B2
(45) Date of Patent: Nov. 30, 2021

(54) TREATMENT OF FECAL MATTER BY SMOLDERING AND CATALYSIS

(71) Applicant: The Governing Council of the University of Toronto, Toronto (CA)

(72) Inventors: Yu-Ling Cheng, Toronto (CA); Shadi Saberi, Oakville (CA); Aaron Fernandes, Toronto (CA)

(73) Assignee: The Governing Council of the University of Toronto, Toronto (CA)

( * ) Notice: Subject to any disclaimer, the term of this patent is extended or adjusted under 35 U.S.C. 154(b) by 21 days.

(21) Appl. No.: 16/318,050

(22) PCT Filed: Jul. 17, 2017

(86) PCT No.: PCT/CA2017/050861
§ 371 (c)(1),
(2) Date: Jan. 15, 2019

(87) PCT Pub. No.: WO2018/010033
PCT Pub. Date: Jan. 18, 2018

(65) Prior Publication Data
US 2021/0139356 A1    May 13, 2021

Related U.S. Application Data

(60) Provisional application No. 62/362,846, filed on Jul. 15, 2016.

(51) Int. Cl.
*C02F 1/72*       (2006.01)
*C01B 32/50*      (2017.01)
(Continued)

(52) U.S. Cl.
CPC .............. *C02F 1/725* (2013.01); *B01J 23/42* (2013.01); *C01B 5/00* (2013.01); *C01B 32/50* (2017.08);
(Continued)

(58) Field of Classification Search
USPC ........ 201/21, 25, 29; 202/96, 105, 117, 118; 210/763
See application file for complete search history.

(56) References Cited

U.S. PATENT DOCUMENTS 1,366,176 A    1/1921   Harger et al.
3,631,073 A    12/1971  Cohn et al.
(Continued)

FOREIGN PATENT DOCUMENTS

CA    2832080 A1    11/2012
CN    201665444 U   12/2010
(Continued)

OTHER PUBLICATIONS

Cheng, Y-L., et al., "A household sanitation process based on integrated diversion/dewatering, drying/smoldering of solid waste, and pasteurization of liquid waste." Presentation at Third International Fecal Sludge Management Conference in Hanoi, Vietnam, Jan. 19-23, 2015.
(Continued)

*Primary Examiner* — Nina Bhat
(74) *Attorney, Agent, or Firm* — Bereskin & Parr LLP /S.E.N.C.R.L., s.r.l.; I. Laurence MacPhie

(57) ABSTRACT

Described are methods and devices for the treatment of fecal matter. A column reactor is used to smolder fecal matter to produce and a volatile components stream and smoldered media. The volatile components stream may be subject to catalysis to reduce the emission of noxious substances and/or generate heat energy. Also described is the use of a turntable for removing smoldered media from the column reactor.

20 Claims, 29 Drawing Sheets

(51) Int. Cl.
    *B01J 23/42*     (2006.01)
    *C01B 5/00*     (2006.01)
    *C02F 11/10*     (2006.01)
    *C02F 103/00*     (2006.01)

(52) U.S. Cl.
    CPC ........ *C02F 11/10* (2013.01); *C02F 2103/005* (2013.01); *C02F 2201/007* (2013.01)

(56) References Cited

U.S. PATENT DOCUMENTS

| | | | |
|---|---|---|---|
| 4,285,916 A | | 8/1981 | Baisden |
| 5,059,404 A | * | 10/1991 | Mansour ................. C02F 11/10 423/201 |
| 7,494,637 B2 | * | 2/2009 | Peters ..................... C22B 7/001 423/439 |
| 8,132,987 B2 | | 3/2012 | Gerhard et al. |
| 8,567,086 B2 | * | 10/2013 | Kanai ..................... F26B 17/24 34/59 |
| 8,896,507 B2 | * | 11/2014 | Broughton ............ G02F 1/1323 345/84 |
| 8,986,507 B2 | | 3/2015 | Schottdorf |
| 9,388,355 B2 | * | 7/2016 | Mennell ................... B01J 21/18 |
| 2010/0124583 A1 | * | 5/2010 | Medoff ................... A23K 50/80 426/2 |
| 2010/0228062 A1 | * | 9/2010 | Babicki .................. C10B 53/02 585/240 |
| 2010/0259055 A1 | * | 10/2010 | Shoseyov ............. E01H 1/1213 294/1.3 |
| 2011/0111456 A1 | * | 5/2011 | Medoff ..................... C13K 1/02 435/68.1 |
| 2012/0189523 A1 | | 7/2012 | Hirofumi |
| 2015/0051428 A1 | * | 2/2015 | Dayton .................... B01J 38/12 585/242 |
| 2015/0307786 A1 | * | 10/2015 | Dayton ................ B01J 35/1038 201/2.5 |

FOREIGN PATENT DOCUMENTS

| | | |
|---|---|---|
| CN | 103557517 A | 2/2014 |
| CN | 103884043 A | 6/2014 |
| CN | 103900145 A | 7/2014 |
| CN | 204022775 U | 12/2014 |
| CN | 108895468 A | 11/2018 |
| EP | 1060774 A1 | 12/2000 |
| WO | 2018010033 A1 | 1/2018 |

OTHER PUBLICATIONS

Peal, A., et al., "Fecal sludge management: a comparative analysis of 12 cities." Water Sanitation and Hygiene for Development, 2014, 4(4):532 563-575.
Pollution Research Group, "Selection of synthetic sludge simulant for the Bill and Melinda Gates Foundation's Reinvent the Toilet Fair: India 2014." Technical Guide, The University of KwaZulu-Natal, South Africa.
Takahashi, H., and Yanai, H., "Flow profile and void fraction of granular solids in a moving bed." Powder Technology, 1973, 7:205-214.
Yerman, L., et al., "Potential Bio-oil Production from Smouldering Combustion of Faeces." Waste Biomass Valor, 2017, vol. 8, No. 2, pp. 329-338.
Girovich, M.J., "Biosolids treatment and management: processes for beneficial use." Taylor & Francis, 1996.
Spellman, F.R., "Incinerating biosolids." Taylor & Francis, 1997.
Machine translation of Chinese Patent Publication No. Chinese Patent 103900145 from WIPO.
Machine translation of Chinese Patent Publication No. Chinese Patent 103884043 from WIPO.
Machine translation of Chinese Patent Publication No. Chinese Patent 204022775 from WIPO.
Machine translation of Chinese Patent Publication No. Chinese Patent 108895468 from WIPO.
Boschi-Pinto, C., et al., "Estimating child mortality due to diarrhoea in developing countries." Bulletin of the World Health Organization, 2008, 86:710-717.
Lovelady, H.G., and Stork, E.J., "An improved method for preparation of feces for bomb calorimetry." Clinical Chemistry, 1970, vol. 16, No. 3, pp. 253-254.
Yerman, L., et al., "Smoldering combustion as a treatment technology for feces: Sensitivity to key parameters." Combustion Science and Technology, Jun. 2, 2016, 188(6), pp. 968-981.
Yerman, L., et al., "Self-sustaining smouldering combustion of faeces as treatment and disinfection method." APCChE 20015 Congress Incorporating Chemeca, 2015A, Melbourne, Victoria, p. 2677-2684.
Yerman, L., et al., "Smouldering combustion as a treatment technology for faeces: Exploring the parameter space." Fuel, 2015B, 147, pp. 108-116.
Belcher, D., et al., "Viscous heating effect on deactivation of helminth eggs in ventilated improved pit sludge." Water Science and Technology, 2015, 72(7): 1119-26.
Carrington, E.G., "Evaluation of sludge treatments for pathogen reduction." Final Report, Report No. CO 5026/1, European Communities, Sep. 2001.
Fishman, Z., et al., "A Unit Operations Approach for Rapid Disinfection of Human Waste Based on Drying/Smoldering of Solid and Sand Filtration/UV Disinfection of Liquid Waste." Presentation at Fecal Sludge Management Conference in Durban, South Africa, Oct. 29-30, 2012. (Abstract Included).
Fabris, I., et al., "Continuous, self-sustaining smouldering destruction of simulated faeces." Fuel, IPC Science and Technology Press, Guildford, GB, vol. 190, Nov. 17, 2016, pp. 58-66.
Database WPI Week Jul. 2019 Thomson Scientific, London, GB; AN 2018-97104J—& CN 108 895 468 A (Univ China Mining & Technology Xuzhou), Nov. 27, 2018.
International Search Report completed Oct. 23, 2017 and International Preliminary Report on Patentability/Written Opinion completed Nov. 8, 2017 for the corresponding PCT Application No. PCT/CA2017/050861.
Extended European Search Report completed Feb. 18, 2020 for corresponding European Patent Application No. 17826735.
Machine Translation of Chinese Patent Publication CN103557517 "Biomass Secondary Cracking Method and Device" from WIPO, Publication date Feb. 5, 2014.
Machine Translation Chinese Patent Publication CN201665444 "Turntable Type Quantitative Discharge Device" from WIPO, Publication date Dec. 8, 2010.
English Translation of Chinese First Office Action for CN201780049831 dated Jun. 17, 2021.
Chinese First Office Action for CN201780049831 dated Jun. 17, 2021.

* cited by examiner

A (a) Ash from Surrogate feces smoldering (b) Ash from human feces smoldering

A (a) Pre Catalyst condensate

B (b) post Catalyst condensate

A

B

TREATMENT OF FECAL MATTER BY SMOLDERING AND CATALYSIS

CROSS REFERENCE TO RELATED APPLICATIONS

This application is a national phase entry of PCT/CA2017/050861 filed Jul. 17, 2017 (which designates the U.S.) which claims priority to U.S. Provisional Application Ser. No. 62/362,846 filed Jul. 15, 2016, the entire contents of which are hereby incorporated by reference.

FIELD

This application relates to the treatment of fecal matter and in particular to methods and devices for the treatment of fecal matter using smoldering and catalysis.

INTRODUCTION

Globally 2.6 billion people, primarily people living in poverty, do not have adequate access to basic sanitation services, exposing them to risk of diarrheal diseases. Diarrheal disease due to inadequate access to water, sanitation and hygiene services results in 2.5 million preventable deaths a year (Boschi-Pinto et al., 2008). Even with on-site sanitation facilities such as ventilated pit latrines or connected sewerage systems, inefficient emptying and transport, illegal dumping, leakages in sewerage lines, or ineffective central processing can expose the population to health risks. A recent study by the Water and Sanitation Program of the World Bank followed the sanitation transport chain of twelve global cities with 98% household sanitation coverage, and found that, on average, only 34% of collected waste was safely processed (Peal et al., 2014). A household scale sanitation system in which pathogens are destroyed at source would completely obviate traditional fecal sludge management processes and remove the risk of environmental pathogen contamination and human exposure to health risks downstream. In addition, household scale systems would also enhance privacy, personal safety, and pride of ownership.

A number of challenges exist in the development of a technological household scale solution. First, energy and cost efficiencies are better at larger scales. Second, the processing rate is very slow at such a small scale. For a 10 person household, the steady state fecal destruction rate of a continuous process is only about 30 g/h of dry fecal mass. Batch processes are possible but would be more cumbersome and potentially more energy intensive start up/shut down is required between batches. Third, the impact of input variability is significant at small scale. The fractional change in input rate varies dramatically due to the daily schedule of household members, or the presence of visitors (e.g. a wedding). Finally, for a household scale process, the people interacting with the technology are the household members, and therefore the technology must be appropriately designed to be intuitive for users who are not trained to operate or maintain unfamiliar technologies.

Off-grid technological solutions are being developed for the treatment of sewage. One such process consists of a dewatering step to separate free water (urine, wash water, flush water) from solid waste; drying, then incinerating the solid waste by smoldering; and pasteurizing the liquid waste using heat generated from smoldering (Cheng, 2015).

Smoldering is an oxygen-limited process in which reaction between oxygen and solid fuel occurs at the surface of the solid fuel—or feces in the sanitation application. Because feces is a soft solid material, mixing with a hard granular material such as sand may be used to form a porous bed of granular material/feces mixtures that facilitates oxygen/feces contact (Cheng 2015; Yerman et al., 2015; Yerman et al., 2016). While having to mix feces with media is an extra step in the process, smoldering has the advantages that the processing rate can be controlled easily by varying air flow rate (Cheng, 2015).

There remains a need for improved methods and devices for treating fecal matter.

SUMMARY

In one broad aspect, there is provided a method and device for the treatment of fecal matter. In one embodiment, a fuel mixture comprising fecal matter and thermal media is smoldered in a reactor and the resulting volatile components are subject to catalysis. Post-smoldering catalysis provides a number of advantages. For example, in one embodiment post-smoldering catalysis converts fecal byproducts to generate additional heat and reduces the level of undesirable gaseous emissions such as carbon monoxide or hydrocarbons. Heat generated from post-smoldering catalysis may be used to reduce energy expenditure, improve the efficiency of the treatment, or for other purposes. For example, post-catalytic oxidation emissions may be used to dry incoming fecal matter in situ prior to smoldering, pasteurize liquid waste or to heat water for personal use. In some embodiments, the methods and devices described herein are useful for the treatment of dewatered fecal matter, which if healthy contains approximately 75% moisture content, directly without the use of separate drying equipment or a pre-drying step.

In another broad aspect, there is provided a method and device for the continuous or semi-continuous treatment of fecal matter in a column reactor. In one embodiment, a turntable is used to continuously or intermittently remove from the bottom of the column reactor smoldered fuel mixture. Rotation of the turntable causes post-smoldering granular particles to be discharged from a gap between the turntable and the bottom end of the column reactor. The smoldered fuel mixture may then be separated into residual ash and recycled thermal media, which may be mixed with incoming fecal matter before or after being fed back into the reactor. Methods and devices for the continuous or semi-continuous treatment of fecal matter provide a number of advantages over the batch-wise treatment of fecal matter. For example, in one embodiment the use of a continuous or semi-continuous smoldering process removes the need for batch-wise ignition and reduces external energy requirements. In one embodiment, a semi-continuous process as described herein is characterized by cyclical periods of smoldering followed by periods of introducing fuel mixture, or fecal matter and thermal media, into the column, such that the process does not result in significant cooling of the reactor assembly and its contents, and does not require significant energy input to re-ignite the smoldering process. In one embodiment, the use of a turntable to remove smoldered fuel mixture facilitates maintaining a consistent smoldering front within the column reactor during use.

Accordingly, in one aspect there is provided a method for treating fecal matter as described herein. In one embodiment the method comprises:

combining fecal matter with a thermal media to produce a fuel mixture;

smoldering the fuel mixture in a column reactor with a top end and a bottom end to produce a smoldered fuel mixture and a volatile components stream; and subjecting the volatile components stream to at least one catalytic step in a catalytic conversion reactor to produce an exit stream.

In one embodiment, the method further comprises removing the smoldered fuel mixture from the column reactor, optionally using a turntable. In other embodiments, the method comprises using other techniques known in the art for removing material from a column reactor such as, but not limited to, a rotary impeller valve, a belt and/or a vibration mechanism.

In one embodiment, the method comprises introducing airflow into the bottom end of the column reactor, optionally through a port and/or the gap between the bottom end of the column reactor and the turntable.

In one embodiment, the method comprises using a heater to concurrently initiate smoldering of the fuel mixture within the reactor and pre-heat a catalyst within the catalytic conversion reactor. In one embodiment, the heater is a band heater that surrounds the column reactor and is adjacent to or near the catalytic conversion reactor. In one embodiment, the catalytic conversion reactor is an annular reactor that surrounds a portion of column reactor and is adjacent to or near the band heater. In another embodiment, the catalytic conversion reactor is an external catalytic conversion reactor that is connected to the column reactor by a conduit or pipe.

In one embodiment, heat generated from catalysis of the volatile components stream is transferred to the fuel mixture above the smoldering zone in the column reactor to reduce the moisture content of the fuel mixture prior to smoldering the fuel mixture.

In one embodiment, the methods described herein comprise introducing auxiliary airflow into the catalytic conversion reactor to increase the amount of available oxygen within the catalyst bed.

In one embodiment, the methods described herein include subjecting the volatile components stream to at least one catalytic step in a catalytic conversion reactor. In one embodiment, at least one catalytic step comprises catalytic oxidation, optionally by contacting the volatile components stream with a catalyst comprising one or more precious metals, metal oxides or mixtures thereof.

In one embodiment, the method for the treatment of fecal matter described herein is a continuous or semi-continuous process wherein smoldered fuel mixture is continuously or intermittently removed from the reactor and fecal matter and thermal media, or fuel mixture is continuously or intermittently added to the reactor. In another embodiment, the method for the treatment of fecal matter described herein is a batch process, wherein fuel mixture, or fecal matter and thermal media if mixed in situ, is introduced into the column reactor and at least 50%, 75%, 80%, 90%, 95% or greater than 95% of the fuel mixture is smoldered prior to removing the smoldered fuel mixture from column reactor and/or adding additional fuel mixture or fecal matter and thermal media. In one embodiment, the batch process requires heating to re-ignite the fuel mixture to produce a smoldering front.

In another aspect, there is provided a device for treating fecal matter as described herein. In one embodiment, the device comprises:

a column reactor for smoldering a fuel mixture comprising fecal matter and thermal media, the column reactor comprising a top portion and a bottom portion having a bottom end;

a catalytic conversion reactor comprising an inlet for receiving a volatile components stream from the top portion of the column reactor, a catalyst, and an outlet for an exit stream; and a conduit connecting the top portion of the column reactor and the inlet of the catalytic conversion reactor.

In one embodiment, the device further comprises a turntable positioned at the bottom end of the column reactor forming a gap between the turntable and the bottom end of the column reactor. In one embodiment, rotating the turntable discharges smoldered fuel mixture from the column reactor through the gap. In some embodiments, the device may be configured to vary the size of the gap between the turntable and the bottom end of the column reactor.

In one embodiment, the device further comprises a collection unit for collecting smoldered fuel mixture that has been discharged from the column reactor. In one embodiment, the collection unit is a conical collection unit that is positioned beneath the turntable. In one embodiment, the device comprises a separator for separating residual ash from thermal media that has been discharged and/or collected from the column reactor. In one embodiment, the separator is a sieve or perforated plate that physically separates the larger thermal media particles from the smaller residual ash particles. In one embodiment, the separator may include a brush that that travels across the surface of a sieve or perforated plate. Optionally, the separator may be part of the collection unit or external to the collection unit.

In one embodiment, the device further comprises a blower for introducing airflow into the bottom portion of the column reactor, optionally through the gap between the bottom end of the column reactor and the turntable.

In one embodiment, the device further comprises one or more heaters. In one embodiment, the heater concurrently heats a portion of the column reactor and/or the catalytic conversion reactor. In one embodiment, the device comprises a first heater for heating the fuel mixture within the column reactor and a second heater for heating the catalytic conversion reactor.

In one embodiment, the heater is a band heater that surrounds a section of the column reactor. In one embodiment, the catalytic conversion reactor is an annular reactor that surrounds a section of the column reactor, optionally adjacent to the band heater. In one embodiment, the heater is a cartridge heater that is positioned in the bottom of the column reactor.

In one embodiment, the catalytic conversion reactor comprises a plurality of catalysts. In one embodiment, the catalytic conversion reactor further comprises a post-catalysis heat exchanger, optionally a jacket surrounding the top portion of the column reactor such that heat from the catalytic conversion reactor is transferred to the top portion of the column reactor. In one embodiment, heat transferred to the top portion of the column reactor contributes some of the heat needed to dry the fuel mixture prior to smoldering.

In one embodiment, the device comprises a blower for introducing auxiliary airflow into the catalytic conversion reactor upstream of the catalyst to increase the level of oxygen in the catalyst bed of the catalytic conversion reactor. In one embodiment, the blower introduces auxiliary airflow directly into the catalytic conversion reactor. Alternatively or in addition, the blower may introduce auxiliary airflow into the conduit connecting the top portion of the column reactor and the inlet of the catalytic conversion reactor.

Also provided is a method for treating fecal matter, the method comprising:

combining fecal matter with a thermal media to produce a fuel mixture;

smoldering the fuel mixture in a column reactor with a top end and a bottom end to produce a smoldered fuel mixture and a volatile components stream, wherein a turntable is positioned at the bottom end of the column reactor forming a gap between the bottom end of the column reactor and the turntable; and rotating the turntable such that the smoldered fuel mixture is discharged from the column reactor through the gap.

In one embodiment, the method comprises separating the smoldered fuel mixture discharged from the column reactor into residual ash and recycled thermal media. In one embodiment, separating the smoldered fuel mixture comprises using a separator and/or collection unit as described herein such as a conical collection unit and a perforated plate or sieve. Optionally, the method further comprises subjecting the volatile components stream to a catalytic step as described herein.

Also provided is a device for treating fecal matter, the device comprising:

a column reactor for smoldering fecal matter, the column reactor comprising a top portion for receiving fecal matter and a bottom portion having a bottom end; and a turntable positioned at the bottom end of the column reactor forming a gap between the turntable and the bottom end of the column reactor, such that rotation of the turntable discharges smoldered fuel mixture from the column reactor through the gap.

Optionally, the device further comprises a conduit and a catalytic conversion reactor as described herein for the catalysis of the volatile components stream. In one embodiment, the size of the gap and the rotational speed of the turntable can be adjusted. In one embodiment, the size of the gap is from about 1 mm to about 6 mm, optionally from about 2 mm to about 4 mm. In one embodiment, the device further comprises a collection unit for collecting smoldered fuel mixture discharged from the column reactor and/or a separator for separating smoldered fuel mixture into residual ash and recycled thermal media as described herein.

In one embodiment, the device for treating fecal matter described herein comprises one or more thermal sensors, gas sensors and/or moisture sensors. In one embodiment, the device comprises one or more controller and/or microprocessors. In one embodiment, the controller and/or microprocessor is configured to control operating parameters of the device, such as but not limited to airflow into the column reactor or catalytic conversion reactor, rate of removal of smoldered fuel mixture from the column, or activation of the heater, based on data generated by the thermal sensors, gas sensors and/or moisture sensors.

DRAWINGS

The drawings included herewith are for illustrating various examples of methods, and compositions of the teaching of the present specification and are not intended to limit the scope of what is taught in any way.

The disclosure will now be described in relation to the drawing in which:

FIG. 1 shows a process flow diagram of one embodiment for treating fecal matter described herein.

FIG. 2A shows a 3D view of one embodiment of a smoldering/catalysis reactor. FIG. 2B is a sectional view of the smoldering/catalysis reactor shown in FIG. 2A. FIG. 2C shows a portion of a catalytic conversion reactor for one embodiment of the reactor.

Figure 21:
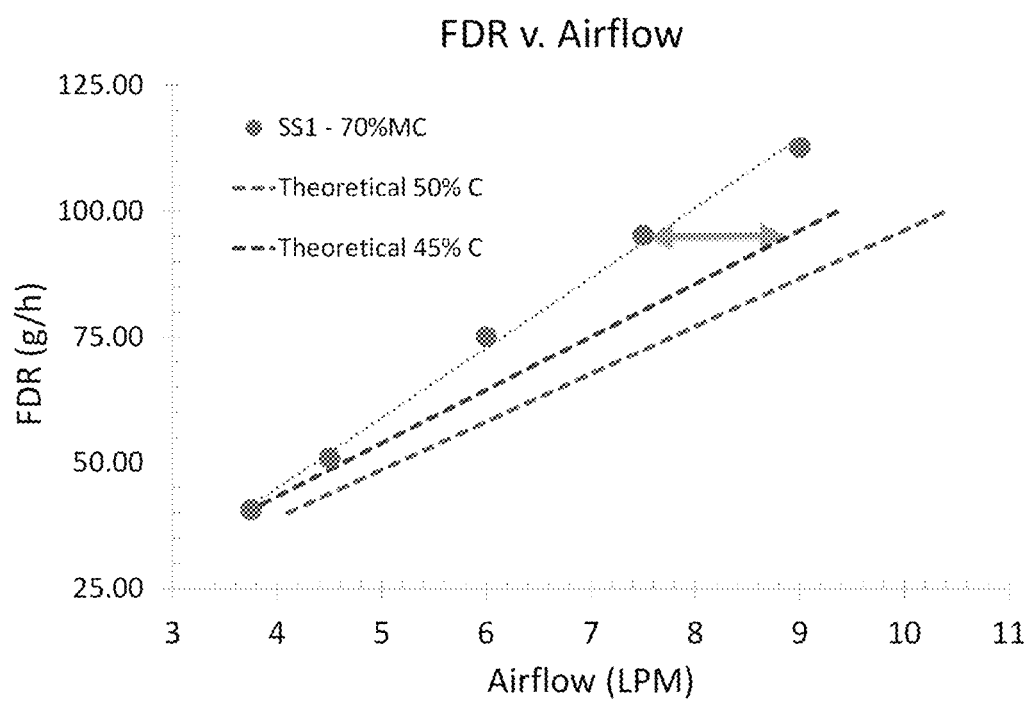

FIG. 21 shows the relationship between FDR and air flow rate required to provide the stoichiometric amount of oxygen for fecal material containing either 45% carbon or 50% carbon. Comparison to experimental data using surrogate feces shows that the fecal destruction rate, as measured by smoldering rate, is higher than the air flow rate can completely convert, thus indicating that auxiliary oxygen is required for post-smoldering catalytic conversion.

Figure 22:
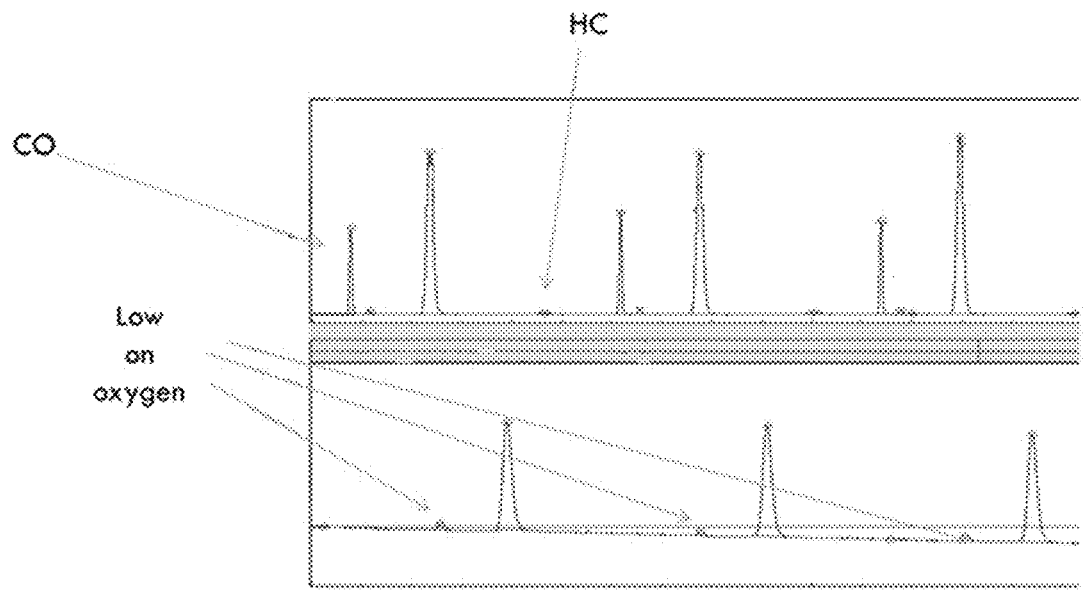

FIG. 22 shows gas chromatograms showing partial oxidation of CO and HC for three consecutive smoldering cycles when the reacting gas stream is oxygen deficient.

Figure 23:
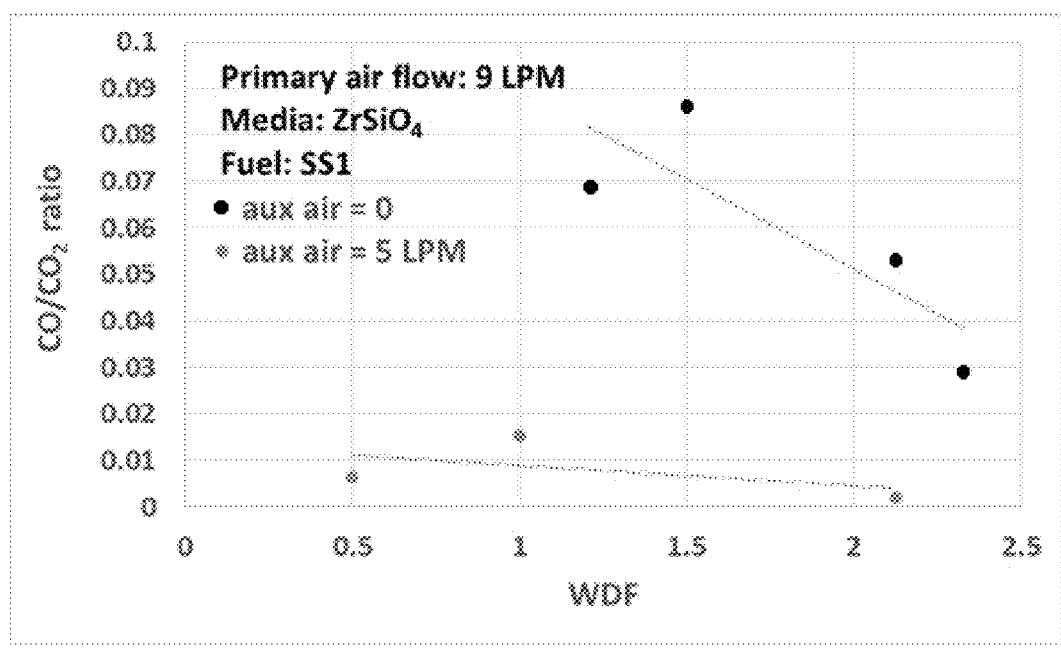

FIG. 23 shows the CO/CO2 ratio in a post catalyst stream with and without auxiliary air for the catalyst.

Figure 24:
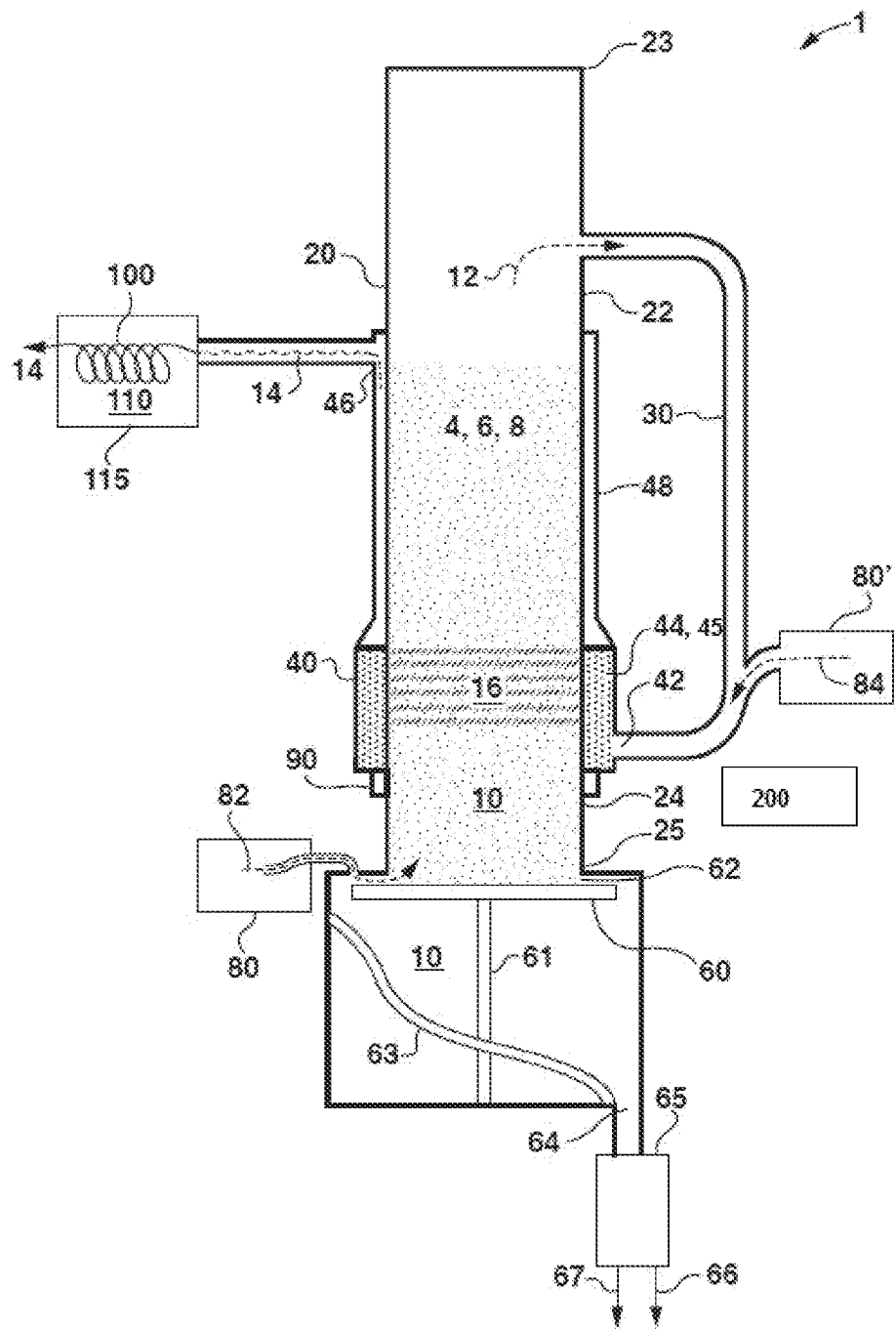

FIG. 24 shows one embodiment of a device for the treatment of fecal matter as described herein.

Figure 25:
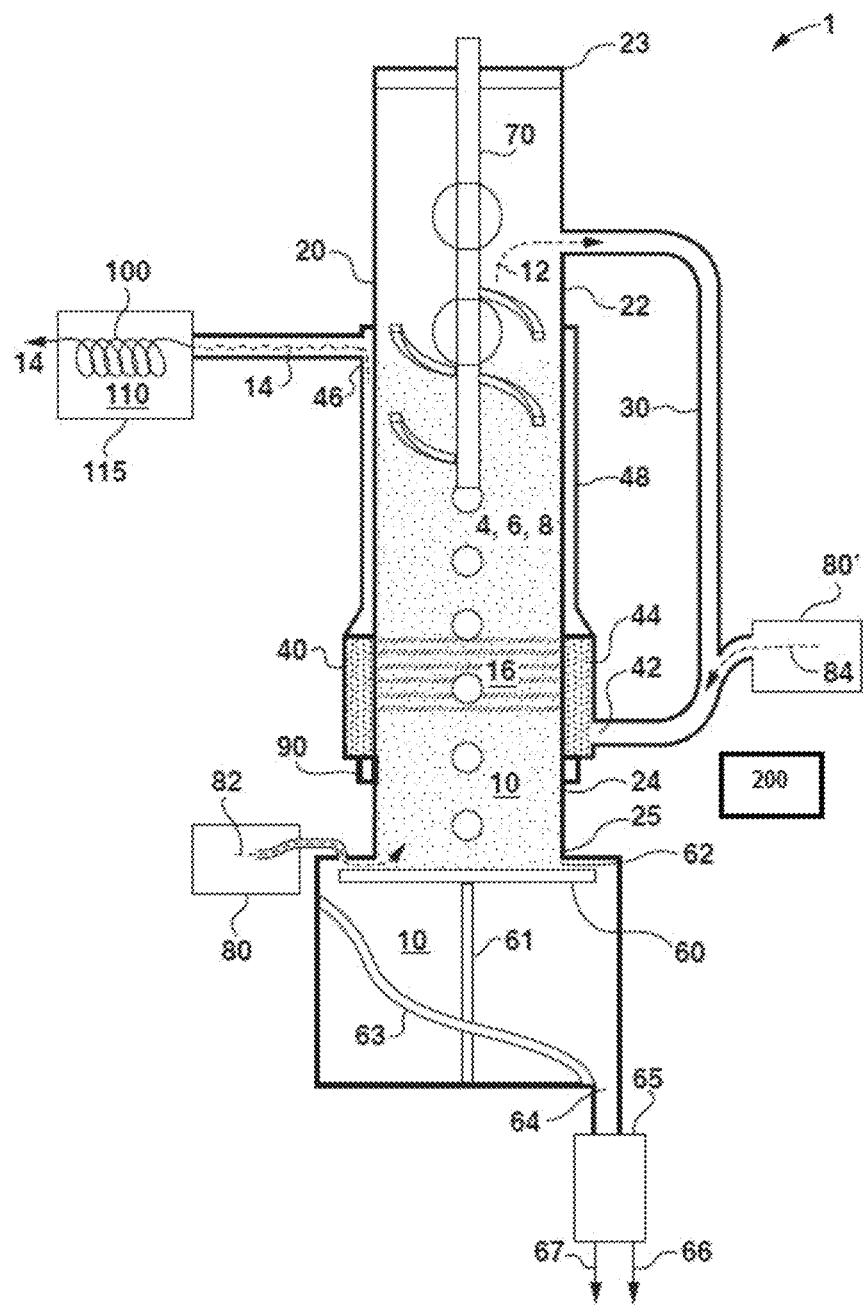

FIG. 25 shows another embodiment of a device of the treatment of fecal matter as described herein that includes a ribbon mixer.

Figure 26:
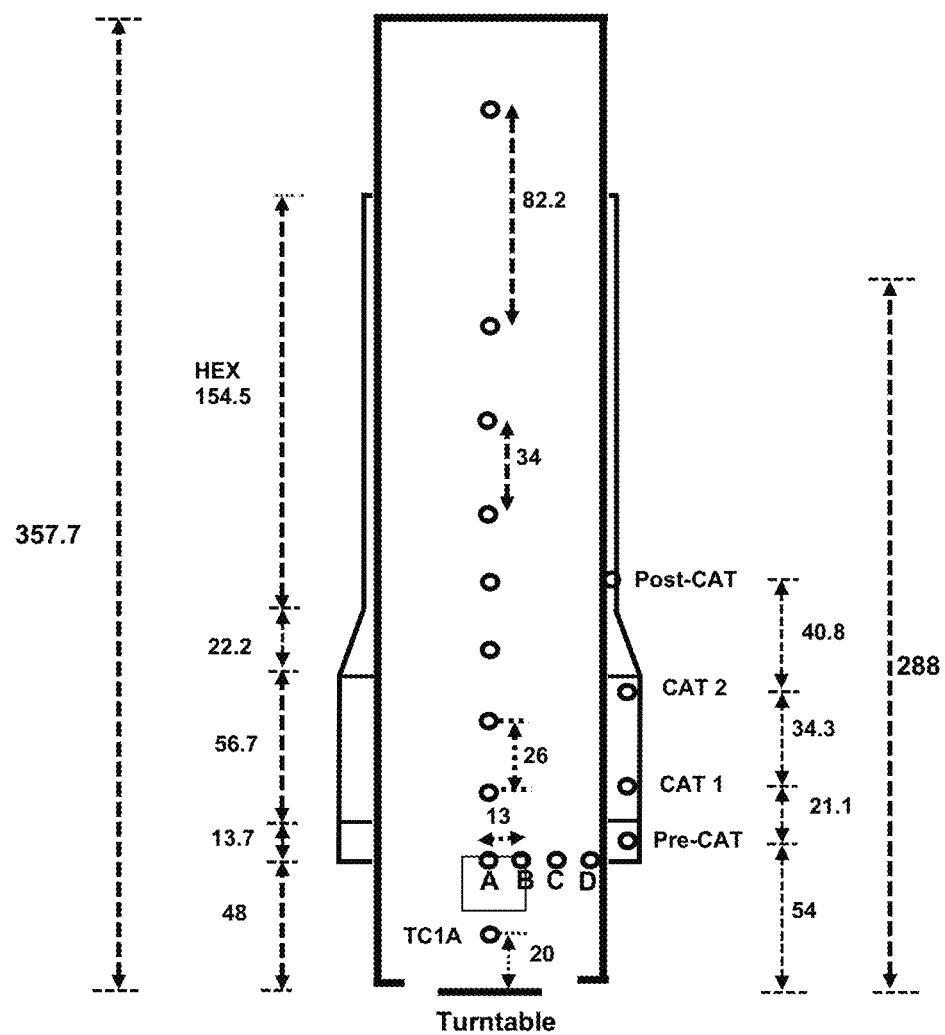

FIG. 26 shows the physical dimensions of a further exemplary smoldering/catalysis reactor as described in Example 3. All dimensions in mm. The radial thickness of the annular heat exchanger (HEX) is 3 mm.

Figure 27:
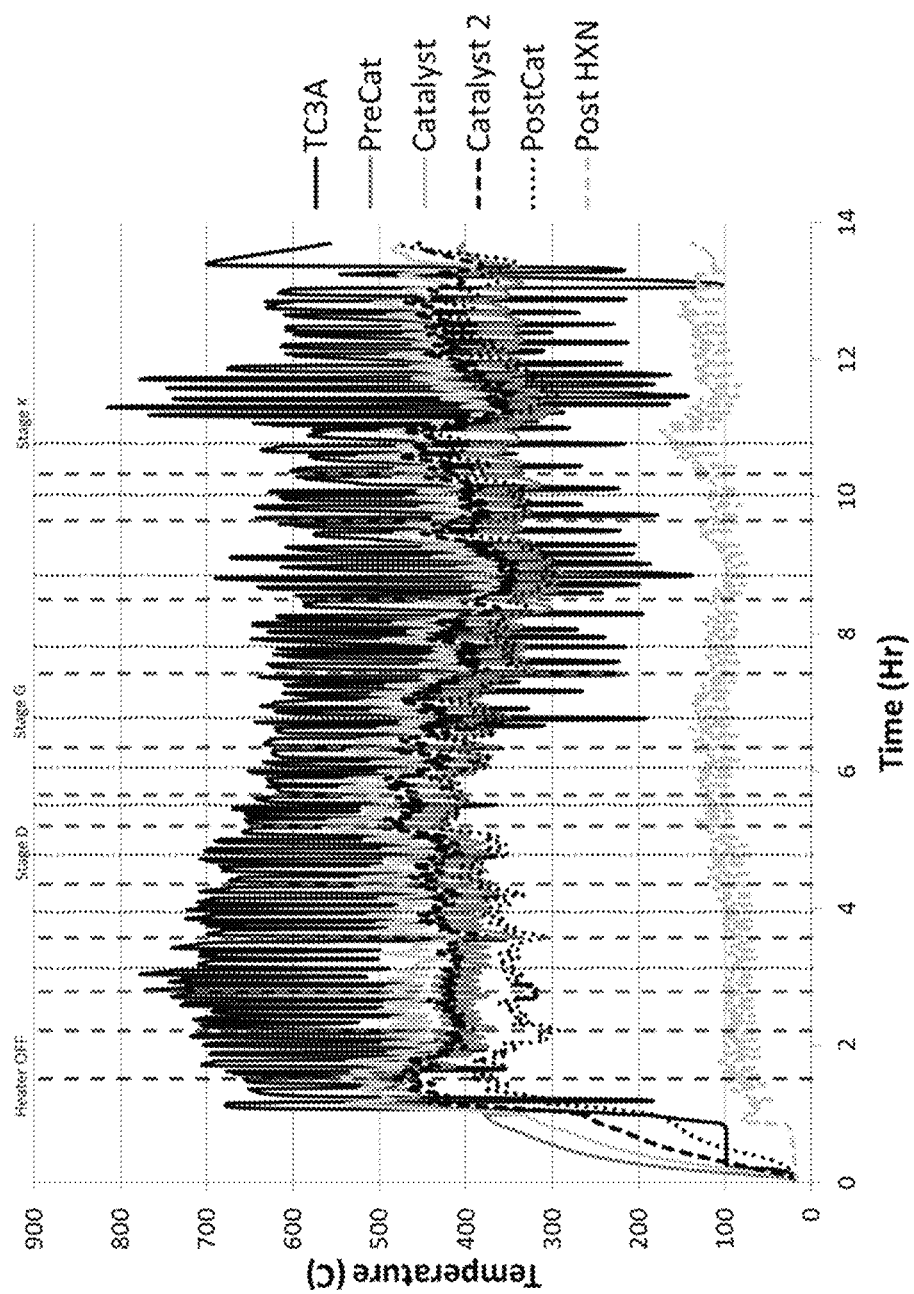

FIG. 27 shows the temperature progression at six different thermocouples in a reactor (TC3A, PreCat, CAT1, CAT2 Post-CAT and Post-HXN) during a smoldering run with feces having a moisture content between 80% and 82%.

Figure 28:
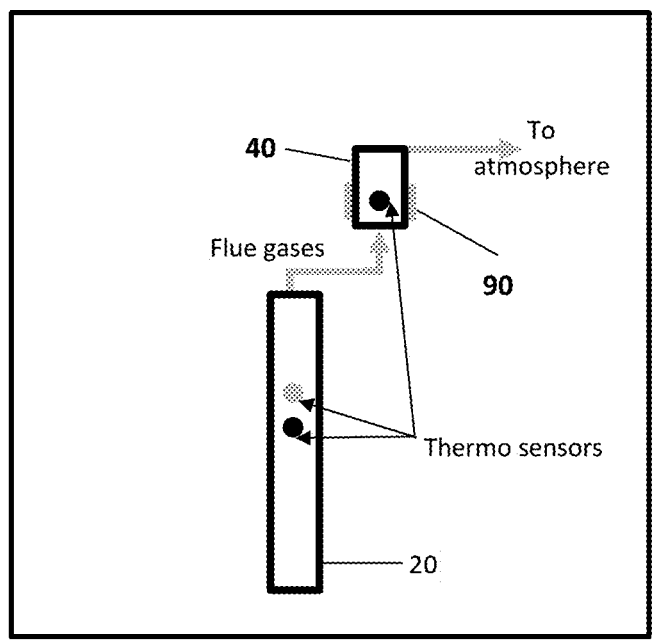
Figure 28:
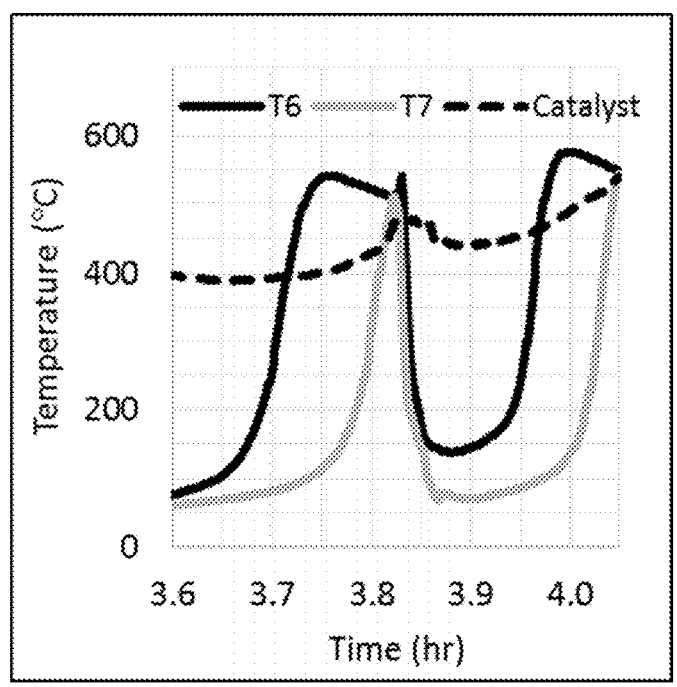

FIG. 28A shows the experimental set-up for testing an external catalyst cartridge with a smoldering column reactor as described in Example 4. FIG. 28B shows the temperature progression at two positions within the column reactor (T6 and T7) and one position within the external catalyst cartridge (Catalyst) during a smoldering cycle.

Figure 29:
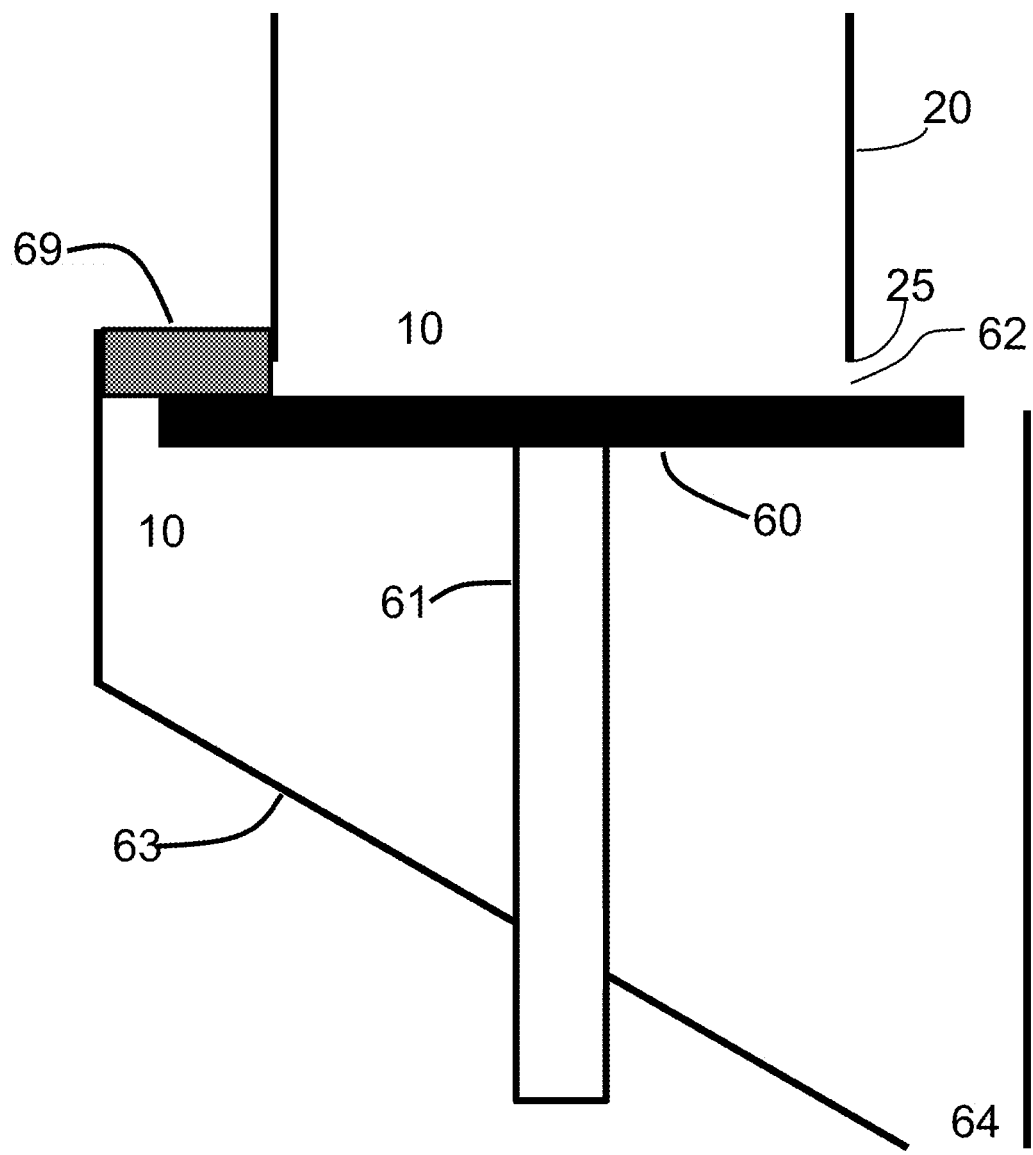

FIG. 29 shows one embodiment of a turntable for removing smoldered fuel mixture from a column reactor. FIG. 29 also shows one embodiment of a conical collection unit for collecting smoldered fuel mixture that has been removed from a column reactor.

Figure 30:
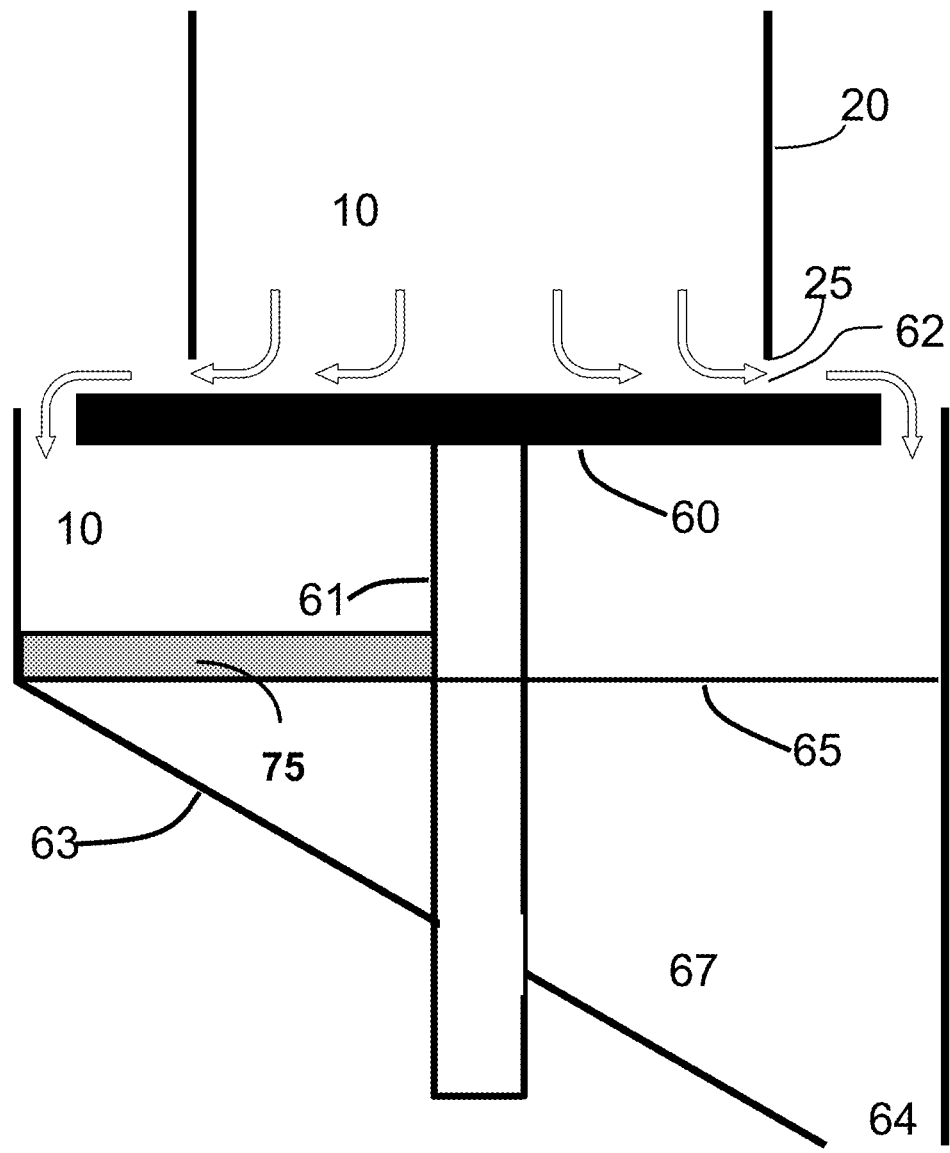

FIG. 30 shows one embodiment of a conical collection unit for collecting smoldered fuel mixture that includes a separator for separating thermal media from residual ash.

Figure 31:
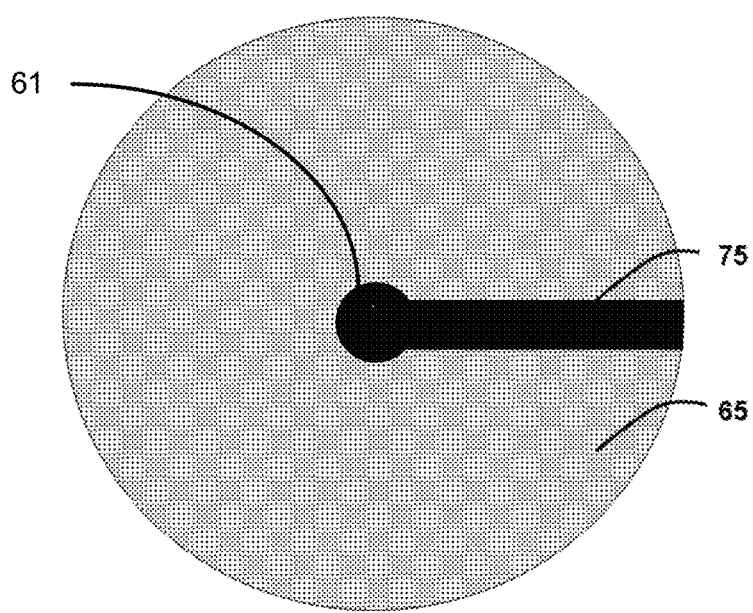

FIG. 31 shows a top view of a separator comprising a circular sieve and brush connected to a rotating shaft.

DESCRIPTION OF VARIOUS EMBODIMENTS

Various methods and compositions will be subsequently described to provide an example of an embodiment of each claimed invention. No embodiment subsequently described limits any claimed invention and any claimed invention may cover methods and compositions that differ from those subsequently described. The claimed inventions are not limited to methods and compositions having all of the features of any one method and composition subsequently described or to features common to multiple or all of the methods and compositions described below. It is possible that a method or composition subsequently described is not an embodiment of any claimed invention. Any invention disclosed in a method or composition subsequently described that is not claimed in this document may be the subject matter of another protective instrument, for example, a continuing patent application, and the applicants, inventors or owners do not intend to abandon, disclaim or dedicate to the public any such invention by its disclosure in this document.

In one aspect, there is provided a method and device (1) for the treatment of fecal matter. In one embodiment shown in FIGS. 24 and 25, the device comprises a column reactor (20) for smoldering fecal matter (4), catalytic conversion reactor (40) and an extractor for removing smoldered fuel mixture from the column reactor, optionally an extractor that includes turntable (60). The column reactor (20) comprises a top portion (22) for receiving fecal matter and a bottom portion (24) having a bottom end (25). The catalytic conversion reactor (40) comprises an inlet (42) for receiving a volatile components stream (12) from the top portion (22) of column reactor (20), a catalyst (44), and an outlet (46) for an exit stream (14). Optionally, the device includes a post-catalysis heat exchanger (48). In one embodiment, post-catalysis heat exchanger (48) is an annular heat exchanger and exit stream (14) passes through the heat exchanger towards outlet (46). Device (1) also includes a conduit (30) connecting the top portion (22) of the column reactor (20) and the inlet (42) of the catalytic conversion reactor (40). The conduit may be any connection that allows the flow of the volatile components stream (12) to the catalytic conversion reactor (40).

In some embodiments, smoldered fuel mixture (10) comprising residual ash and thermal media is removed from the column reactor (20), optionally from the bottom end (25). Different extractors known in the art may be used to remove the smoldered fuel mixture from the bottom end (25) of the column reactor (20). In one embodiment, the smoldered fuel mixture comprises thermal media, residual ash from smoldering the fecal matter in the column reactor, and optionally unburnt char or other material that has passed through the column reactor. In one embodiment, the smoldered fuel mixture is at least 80%, 85%, 90%, 95%, 98% or 99% thermal media and residual ash. In one embodiment, a turntable (60) positioned at the bottom end (25) of the column reactor forming a gap (62) between the turntable (60) and the bottom end of the column reactor. Rotating the turntable (60) discharges smoldered fuel mixture (10) from the column reactor (20) through the gap (62). In one embodiment, increasing the size of gap (62) and/or increasing the rotational speed of the turntable will increase the rate of discharge of smoldered fuel mixture (10) through gap (62). In one embodiment, the size of the gap (62) between the turntable (60) and the bottom end (25) of the column reactor (20) may be adjusted or controlled.

In one embodiment, the gap is between about 0.5 mm and 20 mm. In one embodiment, the gap is between about 0.5 mm and 10 mm, optionally from about 1 mm and 8 mm, or from about 2 mm and 6 mm.

In one embodiment, the size of the gap in operation is relative to the size of the thermal media (6) used in column reactor (20). In one embodiment, the gap is at least about 2×, 2.5×, 3×, 3.5×, 4×, 4.5×, 5×, 6×, 7×, 8×, 9×, 10×, or greater than 10× the average diameter of the thermal media (6). For example, in one embodiment thermal media (6) has a diameter of about 1 mm and the gap has a size of between about 2 mm to 5 mm, optionally between about 2 mm to 4 mm. In another embodiment, the thermal media has a diameter of about 2 mm and the gap has a size of between about 4 mm and 10 mm, optionally between about 4 mm and 8 mm. In one embodiment, the gap is between about 2× and 8×, between about 2× and 6× or between about 2× and 5× the average diameter of the thermal media (6).

In one embodiment, the diameter of turntable (60) is at least 100%, 110%, 120%, 130%, 140%, 150%, 175%, 200% or greater than 200% of the diameter of column reactor (20). In one embodiment, the diameter of turntable (60) is between 100% and 200%, between 100% and 200%, or between 100% and 150% of the diameter of column reactor (20).

In one embodiment shown in FIG. 29, a stationary scraper or plow (69) is positioned to scrape material off the perimeter of turntable 60 as it rotates. In one embodiment, the use of a stationary scraper or plow (69) results in the smoldered fuel mixture being localized as it is discharged off the turntable rather than being discharged around the perimeter of the turntable.

While FIGS. 29 and 30 show the use of a turntable (60), the extractor may be any mechanism that allows for smoldered fuel mixture (10) to be removed from the bottom end (25) of column reactor (20). In one embodiment, the extractor allows for the continuous or semi-continuous removal of smoldered fuel mixture from the bottom end of the column reactor. In some embodiments, the extractor may comprise a rotary impeller valve, a belt mechanism and/or vibration mechanism.

In one embodiment, smoldered fuel mixture (10) removed from the column reactor (20) may be recycled and used for additional treatments of fecal matter in the same device or another device.

For example, in one embodiment the separator (65) comprises a sieve or screen that is sized to retain thermal media and allow residual ash to pass through the sieve or screen. In one embodiment, the smoldered fuel mixture is agitated or mixed on top of the sieve or screen in order to enhance the separation of thermal media from residual ash. Alternatively or in addition, a vacuum and/or blower may be used to generate pulsed or continuous airflow in order to enhance the separation of thermal media from residual ash.

As shown in FIG. 30, in one embodiment separator (65) is a sieve or screen positioned below turntable (60) within a collection unit (63). Alternatively, as shown in FIGS. 24 and 25, separator 65 may be positioned to receive smoldered fuel mixture downstream of the collection unit after passing through aperture (64). In one embodiment shown in FIGS. 30 and 31, a brush (75) may be used to agitate, move and/or mix the smoldered fuel mixture on top of the sieve or screen. Optionally, the brush may be connected to the bottom side of a turntable (60) or to a rotating shaft (61) in order to drive the brush across the surface of the sieve or screen. In one embodiment, the brush comprises pliable material, optionally a plurality of bristles or segments. In one embodiment, the brush is made of a single piece of pliable material.

In one embodiment, the recycled thermal media (67) is combined with fecal matter (4) to produce the fuel mixture (8). The fecal matter may be mixed with recycled thermal media (67) and/or new thermal media (6) in situ within the column reactor to produce fuel mixture (8). In one embodiment a mixer (70), such as a ribbon mixer, suitable for mixing fecal matter (4) and thermal media (6) or recycled thermal media (67) is used to produce the fuel mixture (8). Preferably, the mixer is any type of mixer that generates an evenly mixed fuel mixture, such as, but not limited to agitators or paddle blenders.

In another embodiment, fecal matter (4) is mixed with recycled thermal media (67) and/or new thermal media (6) externally outside of the column reactor (20) and the resulting fuel mixture (8) is then introduced into the top end (23) of the column reactor (20).

In one embodiment, the device includes one or more ports at the top portion (22) of the column reactor for introducing fecal matter (4), thermal media (6) and/or fuel mixture (8) into the column reactor (20). Different methods and/or devices may be used to introduce fuel mixture, or fecal matter and thermal media if mixed in situ, into the column reactor. For example, fuel mixture and/or fecal matter and thermal media may be introduced into the column reactor using a piston pump and/or peristaltic pump. Alternatively or in addition, an extruder or auger may be used to introduce fuel mixture and/or fecal matter and thermal media into the column reactor. In one embodiment, fuel mixture and/or fecal matter and thermal media are manual loaded into the column reactor. In one embodiment, fuel mixture and/or fecal matter and thermal media is introduced into the column reactor from a holding tank.

In some embodiments, smoldering the fuel mixture requires the introduction of air into the column reactor. Accordingly, in one embodiment airflow (82) is introduced into the bottom portion (24) of the column reactor such as by using a blower (80). The blower may be any device that is capable of generating a positive air pressure such as, but not limited to a pump, compressor or fan. In one embodiment, the blower (80) introduces airflow (82) through the gap (62) between the bottom end of the column reactor and the turntable. Alternatively or in addition, the blower (80) introduces airflow (82) through one or more ports on the bottom portion (24) of the column reactor (20) or through a manifold surrounding all or part of the bottom portion (24) of column reactor (20).

As demonstrated in the Examples, increasing or decreasing the rate of airflow (82) through column reactor (20) increases or decreases the smoldering rate of fuel mixture (8) in the column reactor (20). In one embodiment, increasing the airflow increases the propagation of the smoldering zone towards the top end of the column reactor. Accordingly, in some embodiments the blower (80) is controllable to increase or decrease the rate of airflow (82) introduced into the bottom portion of the column reactor. Optionally, a controller or microprocessor (200) may be used to control the rate of airflow into the column reactor. For example, in one embodiment the blower is controlled by a controller and/or microprocessor (200) configured to control blower (80) such as in response to commands entered by a user or in response to data generated during operation of the device, such as thermal data, gas data or moisture data. For example, in one embodiment the air flow generated by the blower is adjusted in response to the levels of oxygen, CO and/or $CO_2$ levels detected by one or more gas sensors. In one embodiment, the controller and/or microprocessor (200) comprises one or more switches located on the device.

In some embodiments, a heater (90) is used to heat a portion of the column reactor (20) and/or the catalytic conversion reactor (40). In one embodiment, the heater is an electric heater, optionally a band heater. In one embodiment heater (90) is used to initiate smoldering of the fuel mixture within the column reactor. In one embodiment, smoldering of the fuel mixture is initiated by heating the fuel mixture to a smoldering temperature and introducing airflow into column reactor.

A skilled person will appreciate that the temperature required to initiate smoldering within the column reactor will depend on the physical characteristics of the fuel mixture. In one embodiment, the temperature required to initiate smoldering is at least about 350° C. In one embodiment, heater (90) surrounds a portion of the column reactor such that in operation the heater heats an axial section of fuel mixture (8) in the column reactor, optionally to a temperature of at least about 350° C. In some embodiments, a fuel mixture with higher moisture content may require a higher temperature to initiate smoldering. In one embodiment, the temperature required to initiate smoldering is between about 250° C. and 400° C. In one embodiment, smoldering is initiated in the column reactor by concurrently or sequentially heating a section of fuel mixture in the column reactor and introducing airflow into the bottom portion of the column. Preferably, once smoldering is initiated within the column reactor the heater is turned off to conserve energy.

In one embodiment, heater (90) is used to heat all or part of the catalytic conversion reactor (40) to improve the efficiency of the catalyst (44) and/or raise the temperature of the catalyst to its light-off or operating temperature. A skilled person will appreciate that the light-off temperature will depend on the particular choice of catalyst or catalysts used in the catalytic conversion reactor to react with the volatile component stream.

Optionally the same heater or a different heater is used to initiate smoldering of the fuel mixture and heat the catalytic conversion reactor. In one embodiment, heater (90) heats the catalyst (44) to a temperature of at least about 250° C., at least about 280° C. at least about 300° C., or at least about 350° C. In one embodiment, heater (90) is used to concurrently initiate smoldering of the fuel mixture and heat the catalytic conversion reactor (40).

In one embodiment, heater (90) is positioned adjacent or near to the catalytic conversion reactor (40) and the column reactor (20) such that the heater concurrently heats the catalytic conversion reactor and a portion of the column reactor. For example, in one embodiment the catalytic conversion reactor (40) is an annular reactor that surrounds a portion of the column reactor (20) and heater (90) is a band heater positioned near or adjacent to the annular reactor and surrounds a portion of the column reactor. Alternatively, in one embodiment the heater is positioned between the catalytic conversion reactor and the column reactor. In one embodiment, heater (90) is positioned within catalytic conversion reactor (40) or within the column reactor (20).

Optionally, a controller or microprocessor (200) may be used to control one or more heaters in the device such as for heating the catalytic conversion reactor (40) and/or the column reactor (20). For example, in one embodiment the heater is controlled by a controller and/or microprocessor configured to heat the column reactor in response to commands entered by a user or in response to data generated during operation of the device, such as thermal data, gas data or moisture data.

In one aspect of the disclosure, smoldering the fuel mixture (8) within the column reactor forms a smoldering zone (16). In one embodiment, the smoldering zone (16) propagates towards the top end (23) of the column reactor (20), consuming fuel mixture (8) and leaving behind smoldered fuel mixture (10). In one embodiment, the smoldering zone (16) is an axial section of the column reactor (20) that is undergoing an oxygen-limited exothermic reaction between fuel and oxygen on the surface of the fuel mixture.

In one embodiment, pyrolysis of the fuel mixture (8) takes place above the smoldering zone (16) to produce char and volatile gases and combustion of the char takes place within the smoldering zone to produce the smoldered fuel mixture (10).

In some embodiments, the peak temperature in the smoldering zone (16) is from about 550° C. to about 700° C. In some embodiments, the temperature in the smoldering zone (8) is below 1000° C., below 900° C., or below 800° C. In one embodiment, smoldering the fuel mixture (8) does not produce a flame within the column reactor (20).

In another aspect, heat generated from the catalytic conversion reactor and/or from smoldering the fuel mixture is used to enhance the efficiency of the process described herein and/or reduce the energy required to operate the process for the treatment of fecal matter.

In one embodiment, the methods and devices described herein allow for the transfer of heat in either direction between the catalytic conversion reactor and the column reactor. For example, in one embodiment smoldering zone (16) is at a higher temperature than catalyst bed (45) and heat is transferred from the smoldering zone to the catalyst bed. In another embodiment, catalyst bed (45) is at a higher temperature than smoldering zone (16) and heat is transferred from the catalyst bed to the smoldering zone.

In one embodiment the catalytic conversion reactor (40) further comprises a post-catalysis heat exchanger (48) such that in operation heat from the catalytic conversion reactor (40) is transferred to the top portion (22) of the column reactor (20). Optionally, the post-catalysis heat exchanger (48) is a jacket surrounding the top portion of column reactor (20).

In one embodiment, heat transferred to the top portion (22) of column reactor (20) reduces the moisture content of the fuel mixture. As demonstrated in the Example 1 and shown in FIG. 16, reducing the moisture content or water to dry fuel (WDF) ratio of the fuel mixture increases both the smoldering peak temperature and the fecal destruction rate.

In another aspect, the devices and methods described herein include introducing auxiliary airflow (84) to the catalytic conversion reactor (40) to provide additional oxygen to the catalyst (44). As set out in Example 2, under certain conditions the level of oxygen in the catalytic conversion reactor can be rate-limiting such that there is incomplete or inefficient conversion of components in the volatile component stream to compounds such as water and $CO_2$.

Accordingly, in one embodiment the methods and devices described herein include introducing auxiliary airflow (84) into the catalytic conversion reactor (40) upstream of the catalyst (44). In one embodiment, auxiliary airflow (84) is combined with the volatile components stream (12) downstream of the smoldering zone (16), preferably into conduit (30) connecting the top portion (22) of the column reactor and inlet (42) or directly into the catalytic conversion reactor (40), optionally directly into the catalyst bed (45). In one embodiment, auxiliary airflow is introduced through one or more ports on the conduit (30) connecting the top portion of the column reactor of the catalytic conversion reactor.

In some embodiments, a blower (80') is used for introducing auxiliary airflow (84) into the catalytic conversion reactor (40), optionally the same blower (80) for introducing airflow into the bottom portion (24) of the column reactor or a different blower. In one embodiment, the blower (80') is controllable to increase or decrease the rate of auxiliary airflow (84) introduced into the catalytic conversion reactor (40). Optionally, a controller or microprocessor (200) may be used to control rate of auxiliary airflow (84) into the catalytic conversion reactor. For example, in some embodiments, the rate of auxiliary airflow (84) into the catalytic conversion reactor (40) is increased if there is incomplete conversion of the volatile component stream (12), or the level of carbon monoxide and/or higher-order hydrocarbons in the exit stream (14) is above a predetermined level. In one embodiment, the level of auxiliary airflow (84) is set relative to the airflow (82) into the bottom portion of the column reactor. For example, in one embodiment, the level of auxiliary airflow (84) is between about 100% and 10% of the airflow (82) into the bottom portion of the column reactor, optionally between about 75% and 25%.

In one embodiment, the methods and devices described include a catalytic conversion reactor (40) for altering the chemical composition of the volatile component stream (12)

such as to reduce the emission of noxious substances. In one embodiment, volatile components stream (12) is subjected to at least one catalytic step. In some embodiments, the at least one catalytic step also generates thermal energy. In one embodiment, the catalytic step is catalytic oxidation. In one embodiment, the catalytic step comprises contacting the volatile components stream (12) with at least one catalyst (44).

In one embodiment, the catalytic conversion reactor (40) comprises an inlet (42) for receiving the volatile component stream (12) from the top end (23) of the column reactor (20). In one embodiment, the catalytic conversion reactor (40) comprises one or more catalyst beds (45) each comprising one or more catalysts (44). In one embodiment, the catalytic conversion reactor comprises an outlet (46) for an exit stream (14).

In one embodiment, catalyst (44) oxidizes carbon monoxide in the volatile components stream (14) to produce carbon dioxide. The catalyst may also convert carbon monoxide, methane and/or hydrocarbons in the volatile components stream (12) into carbon dioxide and water in the exit stream (16). In one embodiment, catalyst (44) reduces the level of carbon monoxide and/or hydrocarbons in the exit stream (14).

Different types of catalysts known in the art may be useful in the devices and methods described herein for treating fecal matter. In one embodiment, the catalyst comprises one or more precious metals, metal oxides, base metal oxides (e.g. Cu, Mn, Co, Ni, Mo or Fe oxides) or mixture thereof. For example, the catalyst may comprise platinum (Pt), palladium (Pd), Pt—Pd, copper oxide (CuO), manganese oxide cerium oxide ($CeO_2$), or a mixture thereof such as CuO—Pt. In one embodiment, the catalyst is a platinum catalyst or a chromium dope cobalt oxide based catalyst, optionally associated with an alumina ($Al_2O_3$) support.

Optionally, the catalyst may be associated with or conjugated to a support. In one embodiment, the support increases the surface area available for the catalyst to react with the volatile component stream. In one embodiment, the support stabilizes the catalyst. In one embodiment, the support is a porous ceramic support or a pellet. In one embodiment, the catalyst is on the outer surface of the support, optionally an egg shell type catalyst or a monolithic catalyst support. In one embodiment, the support comprises carbon, alumina and/or silica. For example, in one embodiment, the support is a monolithic catalyst support comprising an extruded substrate and a plurality of parallel channels separated by thin walls that are coated with the catalytic active substance. In one embodiment, the channels may be round or polygonal, optionally hexagonal. In one embodiment, the monolithic catalyst support is a ceramic monolith made from material with a low thermal expansion coefficient, such as cordierite ($2MgO_2Al_2O_3*5SiO_2$).

The catalytic conversion reactor (40) may include a plurality of different catalysts (44). The different catalysts may be in the same catalyst bed or in different catalyst beds. For example, in one embodiment the volatile component stream (12) is subjected to two or more catalytic steps. In one embodiment, the different catalytic steps are at the same temperature or at different temperatures. In some embodiments, the different catalytic steps occur in the same catalytic bed (45) or in different catalyst beds within the catalytic conversion reactor (40). Optionally, the catalytic conversion reactor comprises two or more catalyst beds separated by one or more heat exchangers such that heat generated from a first catalytic step is transferred prior to the second catalytic step. In one embodiment, the catalytic conversion reactor (40) is positioned adjacent or near to column reactor (20) to facilitate heat transfer between the reactors. Alternatively or in addition, the device may include an external catalytic conversion reactor (40) as shown in FIG. 28A.

In one embodiment, the methods and devices described herein include combining fecal matter (4) with a thermal media (6) in order to produce a fuel mixture (8) that can be smoldered within the column reactor (20). The thermal media is preferably a granular non-combustible solid particle that allows for air to through interstitial spaces in the fuel mixture and contact fuel on the surface of the particle. In one embodiment, the thermal media (6) comprises granular particles, optionally particles with a diameter of less than 10 mm, less than 5 mm, optionally between about 0.5 mm and 3 mm. In one embodiment, the particles with a diameter of about 0.5 mm, 0.8 mm, 1.0 mm, 1.5 mm, 2.0 mm, 2.5 mm or 3.0 mm.

As set out in the Examples, the inventors have investigated the use of different granular materials as thermal media for smoldering fecal matter as described herein. In one embodiment, the thermal media (6) is sand. In another embodiment, the thermal media (6) is zirconium oxide or zirconium silicate. Other materials having the characteristics identified by the inventors may also be used for smoldering fecal matter. For example, in one embodiment, the specific heat capacity of the thermal media (6) is greater than about 400 j/Kg*K. In one embodiment, the specific heat capacity of thermal media (6) is between 500 and 1000 J/Kg*K. In one embodiment, the thermal media (6) has a single grain thermal conductivity of less than 5 $W/m^2K$, optionally less than 2 $W/m^2K$. IN a preferred embodiment, the thermal media (6) has a specific heat capacity between about 500 and 1000 J/Kg*K and a single grain thermal conductivity of less than about 2 $W/m^2K$.

The moisture content of the fecal matter can have a significant impact on smoldering. In some embodiments, the methods and devices described herein may be used to treat fecal matter without any previous drying steps, optionally without any previous drying steps requiring the expenditure of energy. One of the advantages of the methods and devices described herein is the use of thermal energy generated by the process to reduce the moisture content of fecal matter in the column reactor in situ. This allows for the treatment of fecal matter with relatively high water to dry fuel mass ratio (WDF). In some embodiments the fecal matter has a WDF less than 4.0, less than 3.5, or less than 3.2. In some embodiments, the fecal matter has a WDF of between about 2.0 and 4.0, optionally between about 2.5 and 3.5, between about 2.7 and 3.2, or about 3.

The methods and devices described herein can be used to treat fecal matter in a batch process, or in a continuous or semi-continuous process. In one embodiment, smoldering the fuel mixture in occurs in a batch process and the smoldering zone (16) propagates towards the top end (23) of the column reactor such that all or most of the fuel mixture in the column reactor is smoldered prior to removing the smoldered fuel mixture from the column reactor, introducing new fuel mixture into the column and heating the fuel mixture to initiate smoldering.

In another embodiment, smoldering the fuel mixture takes place in a continuous or semi-continuous process. For example, in one embodiment, smoldered fuel mixture (10) is continuously or intermittently removed from the bottom end (25) of the column reactor (20) and fecal matter (4), thermal media (6) and/or fuel mixture (8) is continuously or intermittently added to the top end (23) of the column reactor.

As set out in Example 1, a smoldering zone (16) in column reactor (20) can be maintained through a number of cycles of removing smoldered fuel mixture (10) and addition of new fuel mixture (8) to the column reactor (20). In one embodiment, the methods described herein include controlling the rate of introduction of airflow (82) into the column reactor, the rate of introduction of fecal matter (4), thermal media (6) and/or fuel mixture (8) into the column reactor (20), and/or the rate of removing smoldered fuel mixture (10) from the bottom end of the column reactor in order to raise or lower the position of the smoldering zone (16) in the column reactor, or maintain the position of the smoldering zone in the column reactor. In one embodiment, the level of the smoldering zone (16) in column reactor (20) is raised, lowered or maintained such that smoldering zone (16) is adjacent to or near the catalyst bed (45).

In one embodiment, the methods and devices described herein may operate as a semi-continuous process. For example, in one embodiment the method comprises:
- reducing or stopping airflow (82) into the column reactor;
- removing the smoldered fuel mixture from the bottom end of the column reactor such that the smoldering front is lowered in the column reactor;
- introducing new fecal matter, thermal media and/or fuel mixture into the column reactor; and
- increasing airflow into the column reactor such that the smoldering front propagates towards the top end of the column reactor.

In one embodiment, column reactor (20) has a circular cross section. In other embodiments, the column reactor (20) may have an oval or polygonal cross section. Without being limited by theory, the use of a circular cross section is believed to facilitate the removal of smoldered fuel mixture (10) from the bottom end (25) of the column reactor without causing axial dispersion of the smoldering zone (16).

A skilled person will appreciate that the dimensions of the device may be altered while maintaining one or more of the advantages described herein for the treatment of fecal matter. In one embodiment, the column reactor (20) has a diameter between about 50 mm and 300 mm, optionally between about 100 mm and 250 mm or between about 50 mm and 80 mm. In one embodiment, the column reactor has a diameter between about 2 inches inch and 12 inches, optionally between about 4 inches and 10 inches, or between about 2 inches and 4 inches. In one embodiment, the top portion (22) and/or bottom portion (24) of the column reactor (20) have the same diameter.

In one embodiment, the column reactor (20) has a length between the top end (23) and bottom end (25) of between about 200 mm and 2000 mm or between about 250 mm and 500 mm. In on embodiment, the column reactor (20) has a length between the top end (23) and bottom end (25) of between about 7 inches and 80 inches or between about 9 inches and 20 inches.

In one embodiment, the column reactor is a vertical column reactor. As used herein, "vertical column reactor" refers to a column reactor with a lengthwise axis that within at least 15% of vertical, optionally within at least 10% or within at least 5% of vertical. As used herein, "vertical" refers to the direction aligned with the direction of the force of gravity at the location of the column reactor.

In one embodiment, the methods and devices described herein use thermal energy generated by the treatment of fecal matter to reduce energy expenditure during the treatment, improve the efficiency of the treatment and/or for other purposes. In a preferred embodiment, all or part of the column reactor (20), catalytic conversion reactor (40) and conduit (30) are therefore insulated to prevent heat loss to the environment.

Once initiated, smoldering a fuel mixture as described herein can generate significant amounts of thermal energy. Furthermore, as demonstrated in Example 4 treating the volatile components generated by smoldering a fuel mixture comprising fecal matter in a catalytic conversion reactor generates additional thermal energy. Accordingly, in one embodiment thermal energy contained in exit stream (14) may be used to heat fuel mixture (10) and/or for other purposes.

For example, in one embodiment thermal energy generated by smoldering the fecal matter and/or subjecting the volatile components stream to catalysis may be transferred to a service liquid (110). In one embodiment, a heat exchanger (100) is used to transfer heat to the service liquid (110). In one embodiment, the heat exchanger (100) comprises one or more coils or plates in contact with, or surrounding all or part of, the column reactor (20) and/or catalytic conversion reactor (40). In one embodiment, heat exchanger (100) is a parallel-flow, cross-flow, or counter-current heat exchanger. In one embodiment, heat exchanger (100), column reactor (20), conduit (30) and/or catalytic conversion reactor (40) are insulated to prevent the loss of heat to the environment.

In one embodiment, service liquid (110) is in a service liquid treatment tank (115) and heat exchanger (100) is in contact with the service liquid (110) in the service liquid treatment tank (115).

As used herein, "service liquid" refers to any liquid that is not introduced into vertical column reactor (20) or part of the exit stream (14) and to which heat energy is to be transferred.

In one embodiment, the service liquid is liquid waste, such as urine, washwater and/or flushwater. In another embodiment, the service liquid is water, optionally water for personal use. For example, in one embodiment the service liquid is water for cooking or bathing.

In one embodiment, the service liquid is heated to reduce or eliminate pathogenic organisms such as bacteria in the service liquid. In one embodiment, the service liquid is heated to pasteurize the service liquid. As used herein "pasteurization" or "pasteurize" refers to reducing or eliminating pathogenic bacteria within the service liquid such that it is safe for human consumption or use, or for environmental discharge.

A skilled person will appreciate that increasing the temperature and/or incubation time of the service liquid will generally increase the likelihood of reducing or elimination pathogenic organisms within the service liquid. For example, in one embodiment the service liquid is pasteurized by heating the service liquid to a temperature between about 50° C. to 90° C. for between about 30 seconds and 1 week. In one embodiment, the service liquid is heated to a temperature of at least about 70° C. for about 2 minutes, which has been demonstrated to reduce the concentration of helminth eggs by 6 logs (Belcher et al., 2015). In one embodiment, the service liquid is pasteurized by heating the service liquid to at least about 55° C. for at least about 10 minutes, at least about 30 minutes, at least about hour, at least about 12 hours or at least about 1 day. In one embodiment, the service liquid is pasteurized by heating the service liquid to at least about 65° C. for at least about 5 minutes, at least about 10 minutes, at least about 30 minutes, at least about hour, or at least about 12 hours. Various conditions of temperature and time suitable for reducing the levels of pathogens in sludge have also been described (Carrington, 2001).

In one embodiment, heat from exit stream (14) is used to heat service liquid (110). For example, in one embodiment exit stream (16) is in fluid communication with one or more condensing heat exchangers in contact with the service liquid (110). In one embodiment, the one or more condensing heat exchangers are in contact with the service liquid in a service liquid treatment tank (115).

In one embodiment, there is provided a system comprising a device for treating fecal matter as described herein and a controller and/or microprocessor.

In one embodiment, the device comprises one or more thermal sensors, gas sensors and/or moisture sensors. In one embodiment, the controller and/or microprocessor is configured to control the removal of smoldered fuel mixture from the column, control airflow into the column reactor or catalytic conversion reactor, control auxiliary airflow into the catalytic conversion reactor and/or control the addition of fuel mixture to the top of the column reactor. In one embodiment, the controller and/or microprocessor is configured to control one or more heaters for heating the column reactor and/or catalytic conversion reactor.

In one embodiment, the controller and/or microprocessor is configured to control the rate of smoldering and/or operation of the catalytic conversion reactor, such as in response to changes in the moisture content and/or volume of fecal matter introduced into the column reactor or in response to thermal data generated by the thermal sensors. In one embodiment, the one or more thermal sensors generate thermal data during operation of the device and the controller and/or microprocessor is configured to control the removal of smoldered fuel mixture, control airflow into the column reactor, control airflow into the catalytic conversion reactor and/or control the addition of fuel mixture to the top of the column reactor, based on the thermal data.

For example, in one embodiment thermal sensors within the column reactor may detect an increase in temperature towards the top portion of the column reactor as the smoldering front propagates up the column reactor and the controller and/or microprocessor controls the extractor to increase the removal of smoldered fuel mixture from the column reactor thereby lowering the smoldering front within the column reactor. In another embodiment, thermal sensors within the column reactor may detect a decrease in temperature within or near the smoldering front below a predetermined threshold and the controller and/or microprocessor controls the blower to increase airflow into the column reactor or controls a heater to heat the column reactor.

In one embodiment, the moisture sensor(s) is/are positioned to generate moisture data on the moisture content of fecal matter entering the column reactor and/or within the top portion of the column reactor. In one embodiment, the controller and/or microprocessor is configured to control a heater for heating the column reactor and/or blower for increasing or decreasing air introduced into the column reactor based on the moisture content of fecal matter entering the column reactor.

In another embodiment, the thermal sensors within the catalytic conversion reactor generate thermal data and may detect a change in temperature above or below a predetermined threshold for the preferred operation of the catalytic conversion reactor. In one embodiment, the controller and/or microprocessor controls a heater and/or blower to increase or decrease auxiliary airflow into the catalytic conversion reactor and/or increase or decrease the temperature of the catalytic conversion reactor based on the thermal data.

In one embodiment, gas sensors detect a change in the level of volatile components in volatile components stream (12) or exit stream (14) and controller and/or microprocessor (200) is configured to control heater (90) to increase or decrease the temperature of the catalytic conversion reactor and/or control blower 80' to increase or decrease auxiliary airflow into the catalytic conversion reactor.

The following non-limiting examples are illustrative of the present disclosure:

EXAMPLES

Example 1: Treatment of Fecal Matter Using Smoldering and Catalytic Oxidation in a Column Reactor Materials and Methods
Fuel: Surrogate and Human Feces Human feces and a surrogate were used as the smoldering fuel in this study as summarized in Table 1. Human stool samples were collected from adult volunteers and transported using Fisherbrand™ Commode Specimen Collection Systems, and immediately placed in a freezer until use. Two master batches were produced by pooling and mixing multiple samples from a total of 13 distinct volunteer donors: a 1.2 kg batch pooled from 10 samples, and a 2.8 kg batch pooled from 13 samples. Water to dry fuel (WDF) mass ratio was determined by mass difference before and after drying, and found to be 3.2 and 3.0, respectively, for the two batches. Samples of lower WDF (2.7) used in this study were prepared by partial drying of a fraction of each of the two batches. The dry surrogate formulation was a composition provided by Pollution research group, the University of KwaZulu-Natal (Pollution research group, the University of KwaZulu-Natal. Selection of synthetic sludge simulant for the Bill and Melinda Gates Foundation's Reinvent the Toilet fair: India 2014. Technical guide, South Africa). Surrogate fuel of required WDF was formulated by adding appropriate amounts of water to the dry formulation.

The enthalpy of combustion of each component in the surrogate composition was either found in the literature or determined in our laboratories by bomb calorimetry. Medical and sanitation/biosolids engineering literature report enthalpies of combustion for feces to be in the range of 17:6 to 25:1 kJ/g dry mass, with an average of 21:5 kJ/g (Spellman 1997; Girovich 1996; Lovelady and Stork 1970; Lentner and Wink 1981).

TABLE 1

| Fuel types and dry basis compositions | | | |
|---|---|---|---|
| Ingredient | $\Delta H_{comb}$ (kJ/g) | Surrogate [wt %] | Human Feces [wt %] |
| Polyethylene glycol (MW3350) | 24.1 | 20 | — |
| Inorganics (calcium phosphate) | — | 5 | — |
| Peanut oil | 40.3 | 20 | — |
| Brewer's/baker's yeast | 18.6 | 30 | — |
| Miso paste dry mass* | 16.8 | 5 | — |
| Psyllium | 16.9 | 5 | — |
| Cellulose (cotton linters) | 16.7 | 15 | — |
| Human feces | 21.5 | — | 100 |
| Overall $\Delta H_{comb}$ (kJ/g of dry mass) | — | 22.7 | 21.5 |

*Miso paste contains ≈ 43% water. $\Delta H_{comb}$ = 16.8 kJ/g of dry solid, or 11.7 kJ/g of wet miso. Water added to dry surrogate to achieve desired WDF is adjusted to account for water content in miso as received.

Media

It is necessary to mix feces with non-combustible solid particles for smoldering. The granular particles form a porous matrix that allows air flow thorough the interstitial space and to contact the fuel surfaces. In addition, the mixing process breaks down the fuel to small sizes and increases its specific surface area. Smaller fuel elements result in: a) faster in situ drying of the fuel; b) more intimate contact between fuel particles and hot media, enabling pyrolysis which forms volatiles and char; c) increased surface contact of the formed char with oxygen to facilitate combustion.

Thermal, chemical and mechanical properties of the granular media play important roles in the operability and effectiveness of a continuous or semi-continuous smoldering process. In some embodiments of the process described herein, the media is subjected to reacting conditions, mechanical stresses due to mixing and transport into and out of the column, and cycles of large temperature variations. Therefore chemical inertness, resistance to mechanical attrition, resistance to breakage due to thermal shock, and stability of these properties when exposed to process conditions are desirable characteristics. In addition, the media absorbs the exothermic enthalpy of combustion during smoldering—acting as a thermal battery, while also acting as a medium for heat transfer away from the peak temperature zones at the smoldering front. Thermal diffusivity of the medium impacts the breadth of the smoldering front: a high thermal diffusivity causes the combustion heat generated in the smoldering zone to dissipate to the neighboring areas; excessively fast heat transfer could lead to extinction of the smoldering process. Other considerations include flowability, cost, and availability in the appropriate sizes.

Sand has been used as the granular media due to its low cost and abundance, but its vulnerability to mechanical attrition makes it unsuitable for prolonged re-use in a continuous process (Cheng 2015; Yerman et al., 2015; Yerman et al., 2016). Two chemically inert granular materials with higher hardness than sand, and comparable thermal properties were identified: zirconium oxide and zirconium silicate. Table 2 shows a comparison of the properties of these materials as obtained from the manufacturers (Zirbeads™ and FOX Industries, respectively) to a locally available sand (Hutcheson Sand and Mixes, Huntsville Ontario) which were used in previous studies. Zirconium oxide and Zirconium silicate spheres of 1 mm diameter were used for the experiments described in this example.

It was observed during the smoldering process, media particles are coated with a thin layer of ash. This ash layer reduces the specific thermal conductivity of zirconia and zirconium silicate, and brings the bed apparent thermal conductivities down to values close to the one measured for Hutcheson sand.

TABLE 2

Granular media properties

| Property | Hutcheson Sand | Zirconium Oxide | Zirconium Silicate |
|---|---|---|---|
| Composition | ≈99.7% $SiO_2$ | 99.7% $ZrO_2$, 0.3% MgO | $ZrSiO_4$ |
| Hardness (Moh's scale) | 7 | >8.5 | 7.6 |
| Shape | sub-angular | spherical | Spherical |
| Specific gravity | 2.6 | 5.5 | 4.5 |
| Bulk density (g/cm$^3$) | 1.5 | 3.5 | 2.9 |
| Material thermal | 0.33 | 2 | 3.5 |

TABLE 2-continued

Granular media properties

| Property | Hutcheson Sand | Zirconium Oxide | Zirconium Silicate |
|---|---|---|---|
| conductivity (W/m K) | | | |
| Effective thermal conductivity of packed bed (W/m K)* | ≈0.1 | ≈0.12 | ≈0.16 |
| Specific heat capacity (J/Kg K) | 830 | 630 | 532 |
| Mechanical attrition (% of original mass) † | 4.8 | 0 | 0 |
| Thermal shock attrition (% of original mass) ‡ | 6.6 | 0 | 0 |
| Cost per pound ($) | 0.25 | 30 | 7.3 |

*Effective thermal conductivity of the packed bed based on in-house measurements at 200-600° C. and smoldering conditions.
† Based on in-house measurements after 12 minutes of continuous mixing operation.
‡ Based on in-house measurements after 12 minutes of continuous mixing and thermal cycling between 150° C. and 550° C.

Catalysts

An egg shell type catalyst composed of 0.5% platinum on 2 mm diameter $Al_2O_3$ support was used in this study. These eggshell pellets have an inert, non-catalytic core and a porous outer shell where the active material is deposited as a thin layer to minimize mass transfer resistance of reactants to the catalytic sites. The platinum catalyst can convert CO, $CH_4$ and higher hydrocarbons present in the flue gas emitting from the smoldering column to $CO_2$ and $H_2O$. Catalytic activity as a function of temperature was characterized using 2% CO in an air mixture (Praxair). Catalytic activity, as denoted by CO concentration in exit streams was found to increase between 180° C. and 450° C. Furthermore, using SEM to characterize Pt particle sizes on the support, Pt agglomeration was observed at 800° C. and above in the presence of water vapor, and not seen at 650° C. It is expected that catalytic activity will be different with smoldering flue gas rather than CO as the feed, therefore this information was used only as an approximate guidance to estimate operating temperatures. 280° C. was estimated as the minimum initial temperature, and 500° C. to 650° C. as the optimal temperature range for catalytic operation.

Smoldering/Catalytic Conversion Reactor

Figure 1:
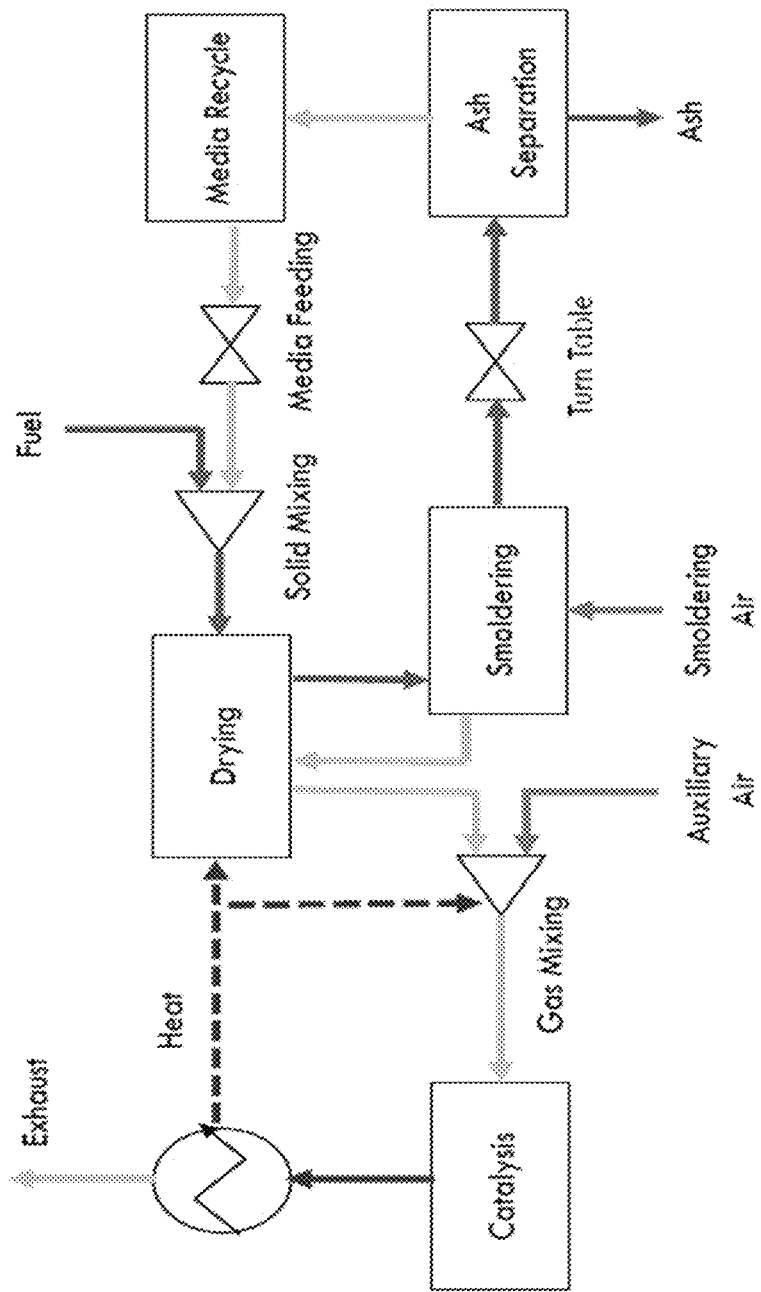
Figure 2:
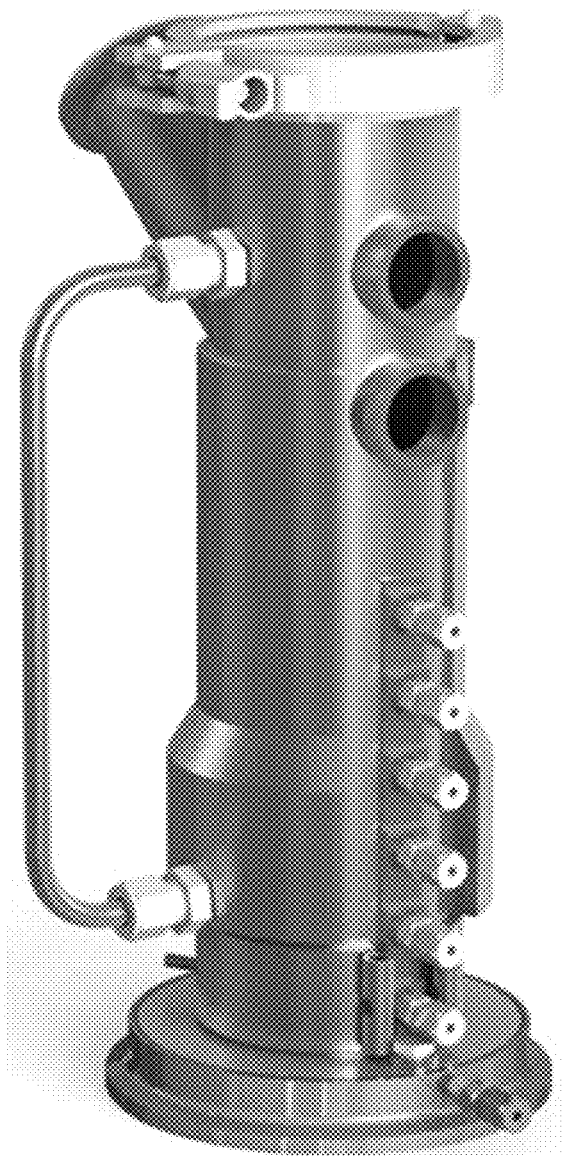
Figure 2:
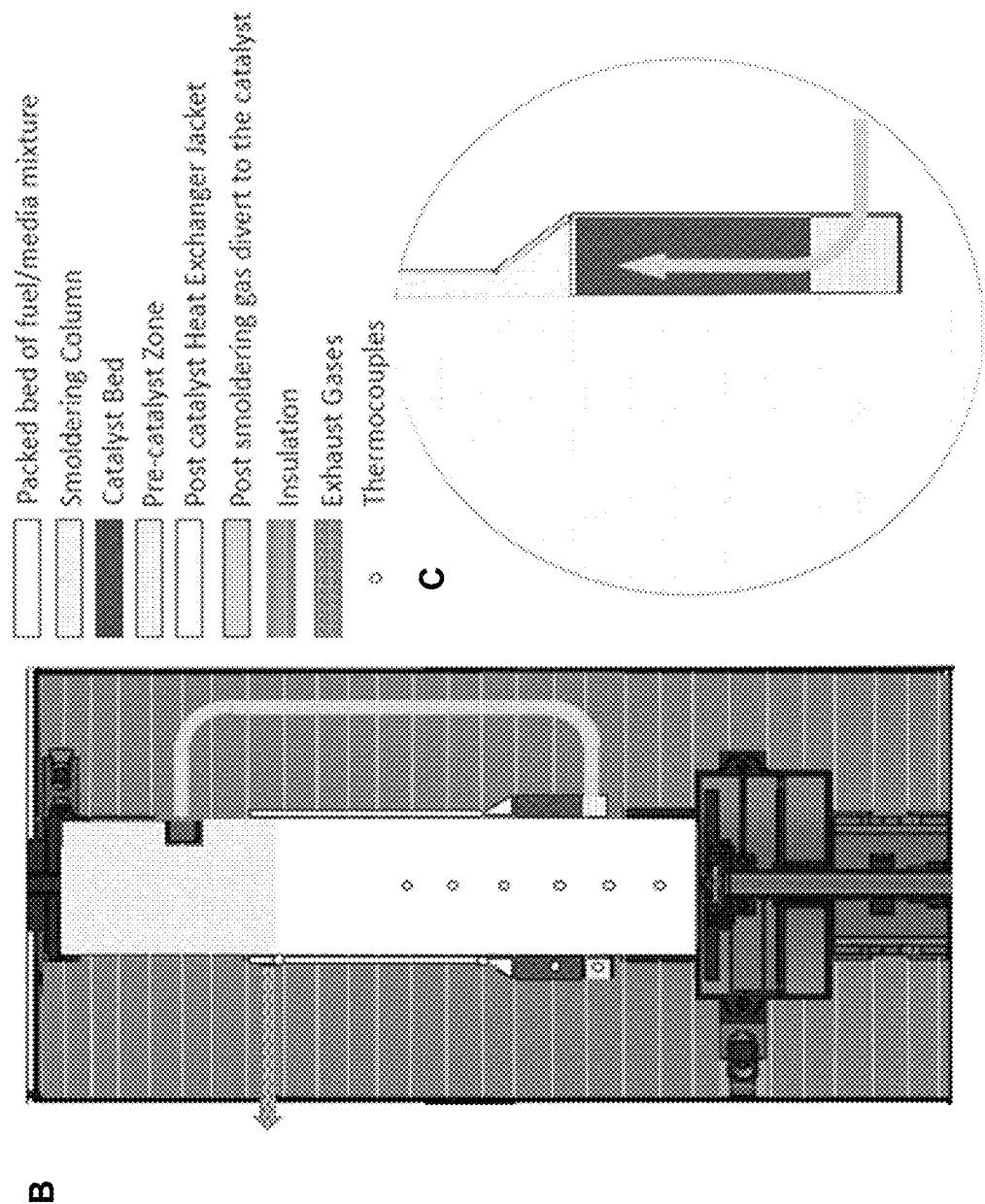
Figure 3:
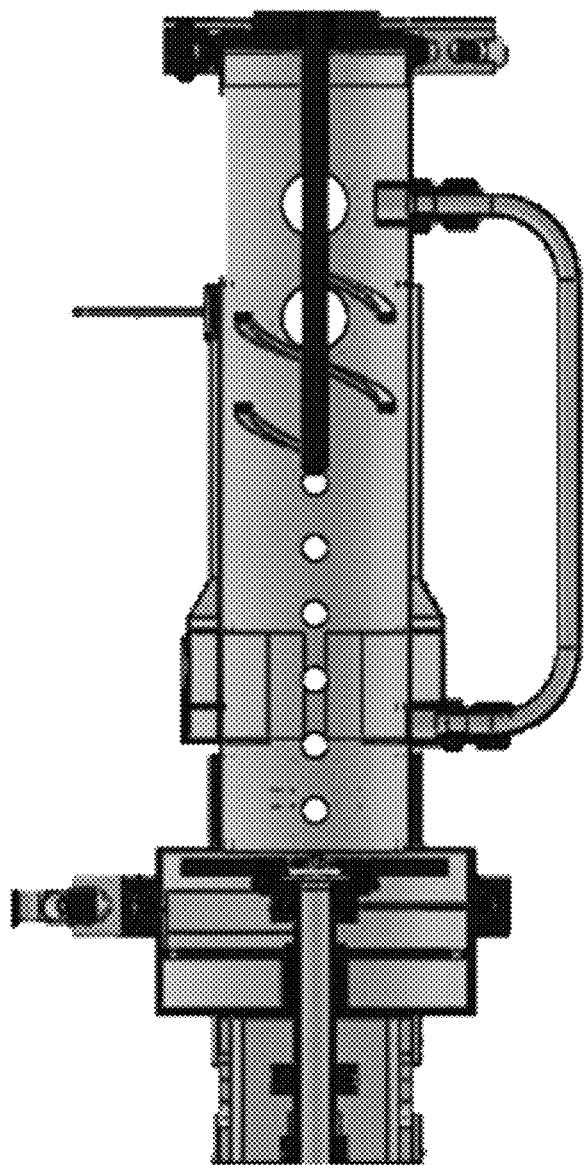
FIG. 3 shows a view of one embodiment of a smoldering/catalysis reactor having a ribbon mixer.
Figure 4:
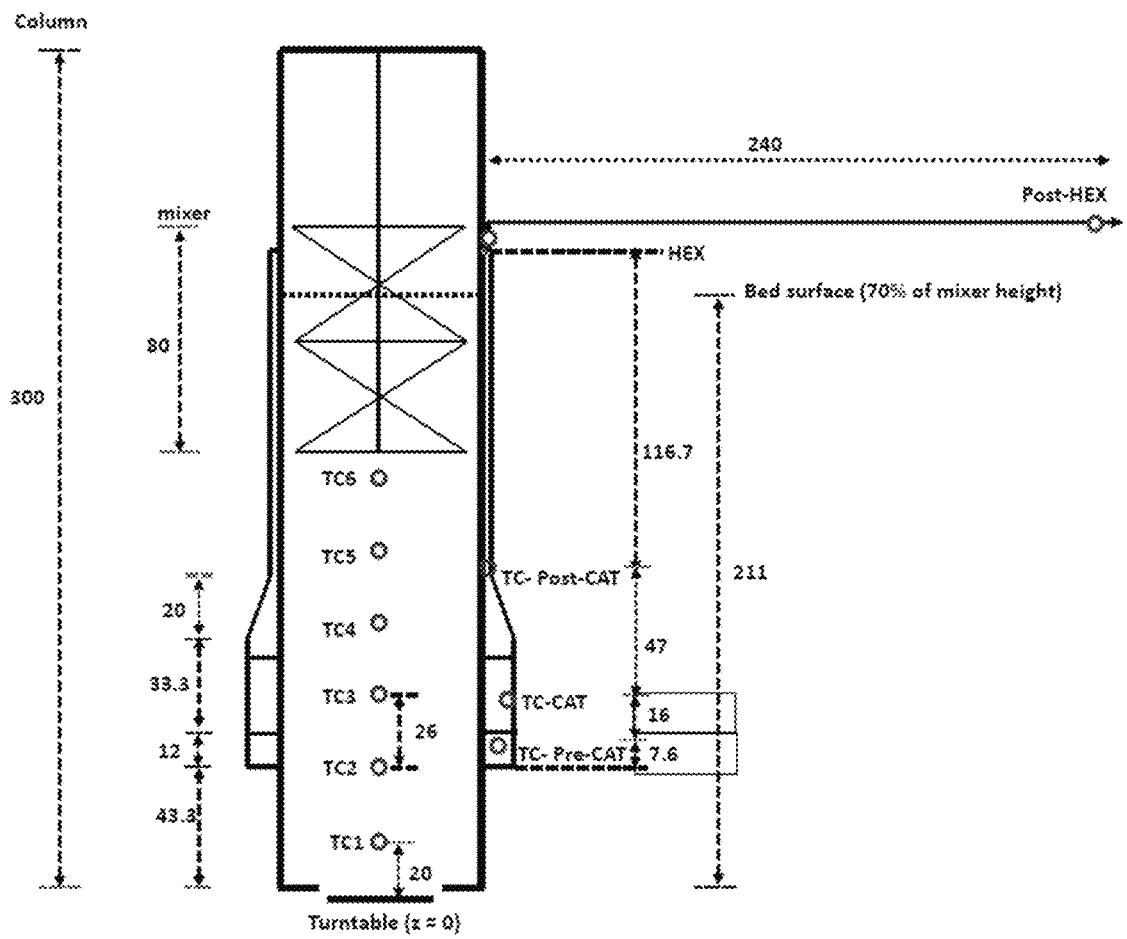
FIG. 4 shows the physical dimensions of an exemplary smoldering/catalysis reactor. All dimensions in mm, and thermocouples inside the reactor ($TC_1$ to $TC_6$) are equally spaced.
Figure 5:
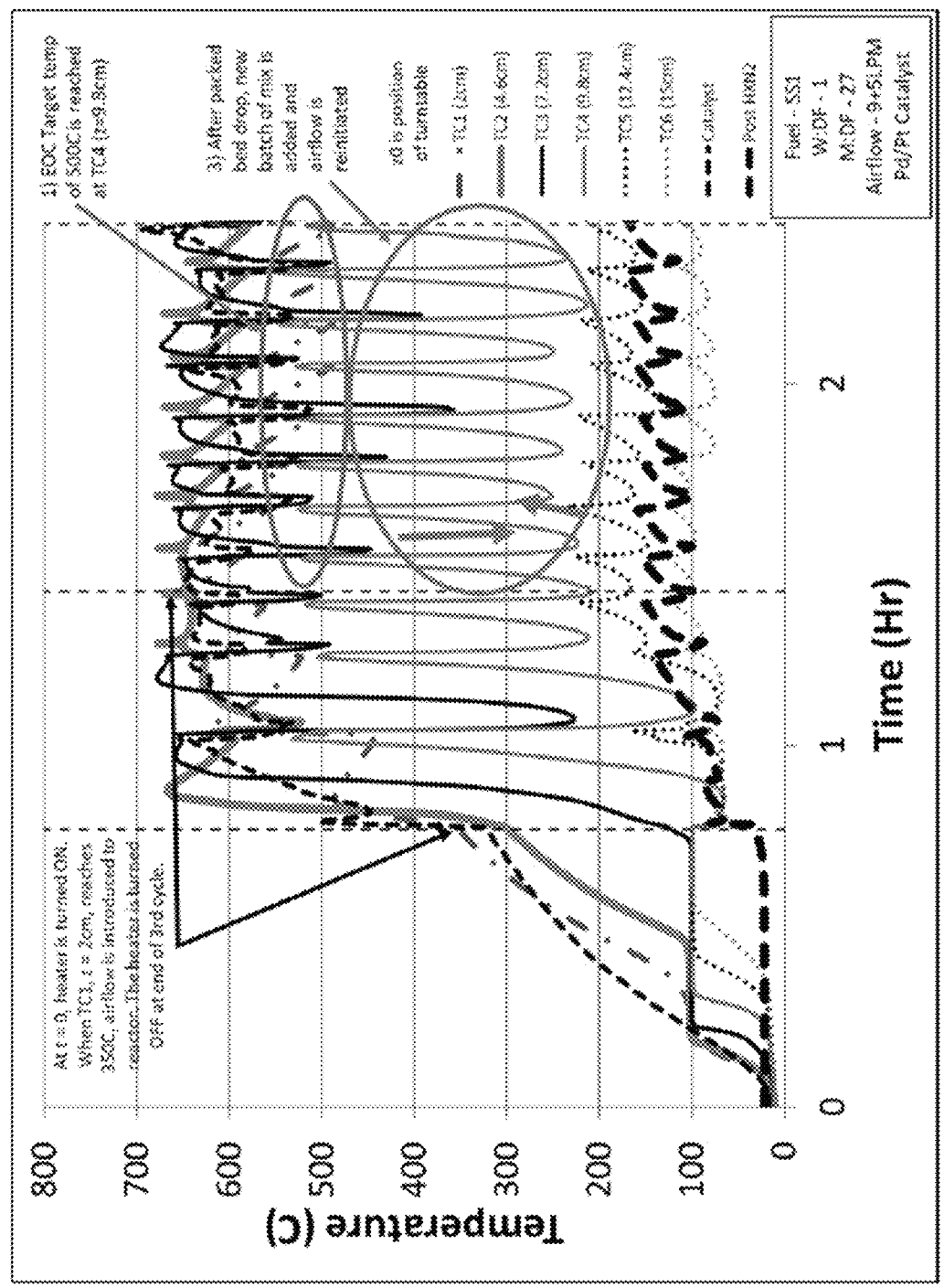
FIG. 5 shows typical temperature scans showing the initial ignition, few cycles and bed drop.

On embodiment of a column reactor suitable for smoldering and post-smoldering catalytic conversion of fecal matter is shown in FIG. 2. Smoldering takes place in a central vertical column of 75 mm inner diameter 300 mm. In manual operating mode, a premixed quantity of thermal medium and fuel is fed at the top of the reactor or through a side port near the top. The reactor is also equipped with inlet ports for fuel and granular medium for continuous operation, and is equipped to accommodate a ribbon mixer to facilitate in-situ mixing.

In typical operation, the column is pre-filled with mixture of fuel and thermal medium. An electric band heater wrapped around the bottom of the column is used to heat the mixture near the bottom of the column until a temperature of 350° C. is reached at TC1. Airflow is then introduced and spontaneous ignition occurs to begin the smoldering process. As smoldering progresses, the smoldering front propagates upwards in the column. Above the smoldering front, fuel pyrolysis takes place in an oxygen-lean environment, producing solid char that is combusted as the smoldering front moves upwards, as well as volatile gases that flow out of the smoldering column. Combustion of pyrolyzed char takes place in the smoldering zone, with peak temperature at the smoldering front typically in the range of 550° C. to 700°

C. Below the smoldering zone, the column consists of granular thermal medium, and ash residues from the smoldered feces.

In batch processes, the smoldering front moves upwards from the point of ignition until the fuel in the entire column is processed. In a continuous smoldering process, the smoldered fuel mixture is continuously removed from the bottom of the reactor while new fuel and medium mixture is continuously input to the top of the column, thus maintaining the smoldering front at an approximately constant position. In a semi-continuous smoldering process, the smoldered fuel mixture is intermittently removed from the bottom of the reactor while new fuel mixture or fecal matter and thermal media is intermittently introduced to the top of the column.

To allow spent thermal medium to be removed from the bottom of the column, an extractor such as a turntable is located at a specified distance below the bottom the reactor column and forms the base of the reactor. For example, the gap between the bottom of the reactor column and the surface of the turntable may be between about 1.5× to 5× the size of the thermal medium. When the turntable is rotated, media and residual ash are discharged from the reactor through the gap between the turntable and the bottom of the column. Such a turntable mechanism has been demonstrated to facilitate granular flow with a uniform front (Takahashi and Yanai 1973).

One advantage of the use of a turntable for removing the smoldered fuel mixture from the reactor is that the smoldering front is not disrupted as the media is discharged. For media of a given particle size, the mass discharged per rotation is dependent on the gap size and the number of rotations of the turntable, and accordingly the discharge rate depends on the turntable rotational speed. The height of solids in the column and solids density (weight of the solids column) are other important factors in the operation and stability of the solids discharge. Above the smoldering front, hardened char from pyrolysis may require additional force to drop.

In an ideal and completely continuous operation, smoldered media would be continuously discharged and recycled to the top of the column along with feces, and mixed in situ while the smoldering process continues undisturbed—keeping the smoldering front at a constant location. For the experiments reported in this Example, continuous operation was approximated in a step-wise cyclic manner. At the end of a smoldering cycle—and the beginning of a new cycle, a media/fuel mixture of desired WDF and MDF which has been pre-mixed ex situ, is fed to the top of the column, and an equivalent quantity of smoldered media is discharged from the post smoldering zone through the turntable. A "bed drop" results from the simultaneous feeding and medium discharge, and the smoldering front position is lowered from its position at the end of the previous cycle. As smoldering progresses in the new cycle, the smoldering front moves upward until the end of the cycle and the process is repeated for each cycle.

Specifically in the present example:

(A) Air flow is stopped when a temperature of 500° C. is reached at TC4 (z=9.8 cm relative to the turntable position.

(B) The turntable is operated to remove 130 cm$^3$ of treated material from the reactor, corresponding to a cycle height of 2.9 cm for the 7.5 cm diameter column.

(C) A neoprene rod (0.3 cm clearance to the wall) is then used to push the packed bed above the smoldering front to drop. The physical drop of the rod and a sharp decrease in temperature at the upper bound of the smoldering front provide confirmation that the packed bed has dropped.

(D) Following packed bed drop, a new batch of ex-situ mixed fuel and media is added above the packed bed and airflow is initiated again.

A blower pumps air through a port and the turntable gap at the bottom of the column, and upward through the column to provide oxygen to the surface of the fuel in the smoldering zone. Flue gases above the smoldering zone carry the various gaseous species produced during various stages of smoldering toward to the top of the column. The gases are then directed via a duct to a catalyst module for further conversion.

Auxiliary air may also be added to the flue gases before entering the catalyst bed to prevent oxygen deficiency during the catalytic oxidation of CO and volatile organics.

Some features of the catalyst module design as shown in FIG. 2 include: a) an annular shape that wraps around the smoldering column at a vertical position that approximately matches the location of the smoldering zone, and b) its proximity to the band heater. These features were designed specifically to synchronize the catalytic and smoldering processes. Once catalytic conversion begins, exothermic heat release will maintain high temperatures and catalytic activity. However, to initiate catalytic reactions, the catalyst temperature has to be above its light0off temperature of approximately 280-320° C. Therefore, the catalyst bed is preferably pre-heated, just as the smoldering process needs to be pre-heated and ignited. Proximity of the catalyst bed to the band heater allows the two pre-heating processes to occur at the same time. In addition, since the optimal temperature range for the catalyst is about 500° C. to 650° C., in the same approximate range as the temperatures in the smoldering zone, the vertical proximity of the catalyst bed and the smoldering zone helps to keep the catalyst temperature in the optimal range.

Finally, the exothermic enthalpy of reaction released in the catalyst bed results in high flue gas temperatures, and directing the flue gases through an annular heat exchanger jacket wrapped around the upper part of the smoldering column is used for in situ drying of the mixture before it is transferred to the smoldering zone. This in-situ drying capacity enabled by heat recovery from post catalytic gases is the key to smoldering as received fuel with full moisture content without the need for a pre-drying step.

Results and Discussion

Thermochemical Characteristics of Fecal Matter

Human fecal matter is comprised of water, organic and inorganic species. Similar to other types of biomass, when a sample of fecal matter is heated starting from room temperature in atmospheric conditions, water starts to evaporate until the sample is dried. The evaporation is usually completed when the sample is held for a sufficient time at 100° C. or slightly higher. The required time depends of the sample size, porosity, nature of water bonding, sample surface area, and humidity in the surrounding atmosphere. As the sample temperature further rises, usually between 200° C. and 400° C., some of the organic species are volatilized and leave the sample. The volatile species include gases such as $CO$, $CO_2$, $CH_4$, $H_2O$, as well as $C_2/C_3$ and heavier hydrocarbons including aromatics and phenolics. The light gases are usually products of thermal decomposition of the heavier compounds. It should be noted that in this temperature range, the oxidation rate of pyrolysis products in air is negligible. Therefore, pyrolysis can be considered as a nearly purely thermal process, even in presence of oxygen. Pyrolysis products have a high calorific content which can be recovered in a subsequent process step such as thermal or catalytic combustion, as is demonstrated in the present work where the latter is used.

The non-volatile organic fraction left behind at the end of pyrolysis is commonly known as char. If the heating continues and the sample temperature climbs to 450° C. and higher, the char will combust in presence of oxygen, leaving inorganic ash behind. The gaseous products of char combustion are mostly CO and $CO_2$. Small amounts of NOx and $SO_2$ could be formed if nitrogen and sulphur are present.

The smoldering of char is a surface reaction. Formation of ash on char surface during the initial stage of oxidation creates resistance to oxygen diffusion. Therefore, the oxidation is incomplete and significant quantities of CO is produced. $CO=CO_2$ ratios of 0.1-0.5 have been reported in the literature for various types of fuel, and approximately 0.4 for surrogate fuel. This ratio is a function of fuel surface area, and temperature with several studies reporting that the $CO=CO_2$ ratio follows an Arrhenius dependence with temperature. In addition to CO, significant amounts of other organics are in the smoldering emissions.

Figure 6:
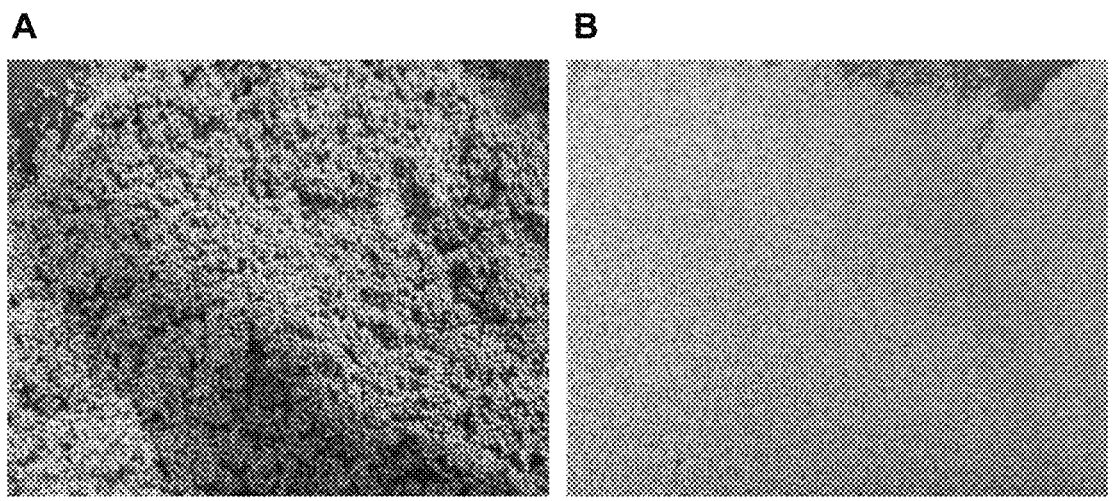
FIG. 6 shows the mixture of human feces and zirconium silicate media pre-smoldering (6A) and post-smoldering (6B).
Figure 7:
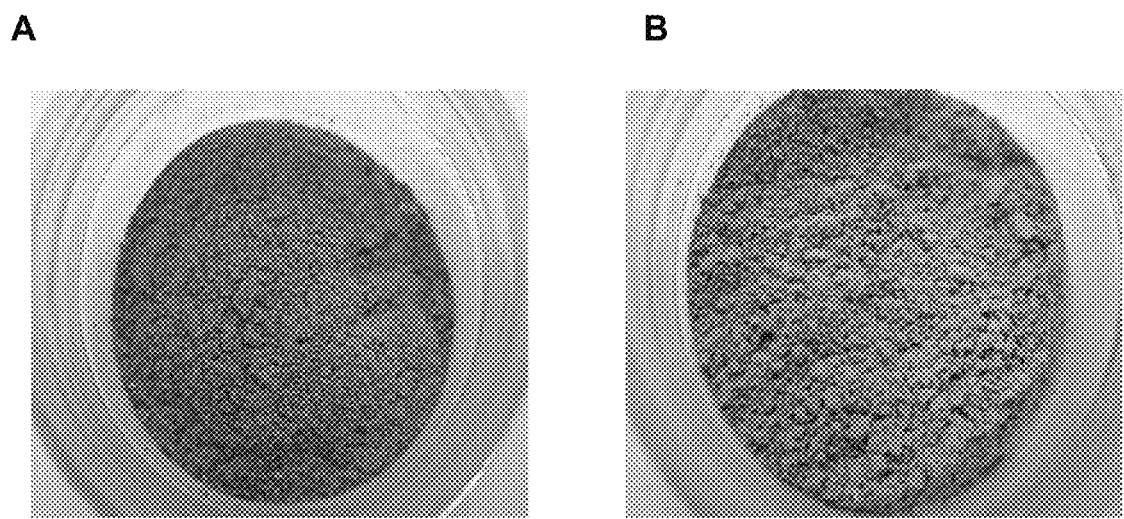
FIG. 7 shows the remaining ash from smoldering of surrogate feces (7A) in comparison with the ash from human feces (7B).
Figure 8:
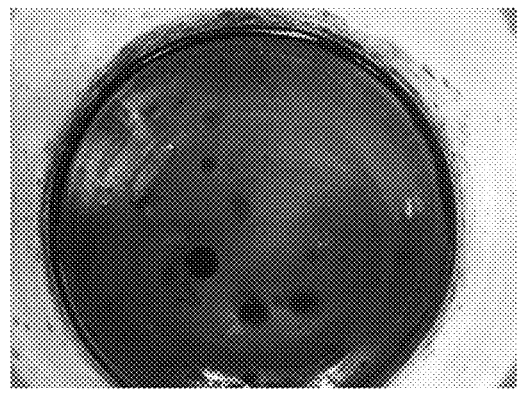
FIG. 8 shows a condensate sample of the emissions without a catalyst (8A; pre-catalyst emission condensate) and after passing through the catalyst (8B; post-catalyst emission condensate).
Figure 8:
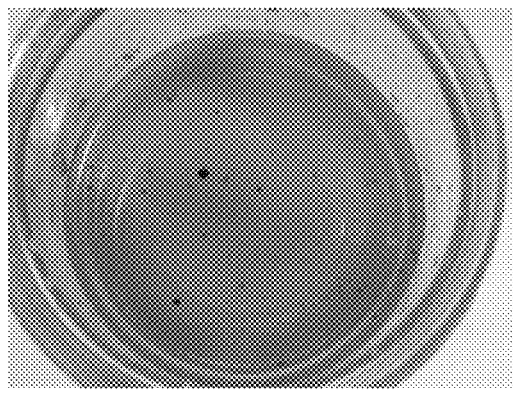

FIGS. 6-8 show the fate of human feces through stages of the process described herein. FIG. 6 shows a photograph of human feces and zirconium silicate that have been mixed using a typical food mixer ex situ, and a photograph of the same mixture post-smoldering—showing the elimination of feces due to smoldering. Mixtures of human feces with zirconium oxide, or surrogate feces with either media are similar in appearance.

FIG. 7 shows post-smoldering residual ash from either surrogate feces or human feces that have been separated from the smoldering media. There is a marked visible difference between the two with the human fecal ash being much finer and lighter in appearance than surrogate ash. Ash from human fecal matter includes a range of minerals and inorganic compounds that are distributed throughout fecal matter in different ways. Ash from surrogate feces is directly attributable to the calcium phosphate added in the surrogate formulation. Both compositional and morphological (density, porosity, average particle size, and particle size distribution) differences are expected.

FIG. 8 shows the liquid collected by condensing emissions from typical smoldering experiments either upstream or downstream of the catalyst module. This liquid includes evaporated water content in the feed fuel, water produced via reaction, and fuel that has not been completely converted and is condensable at room temperature. The color intensity difference is a qualitative indication that extensive, though still incomplete, conversion occurs in the catalyst module.

TGA and DSC Data

Figure 9:
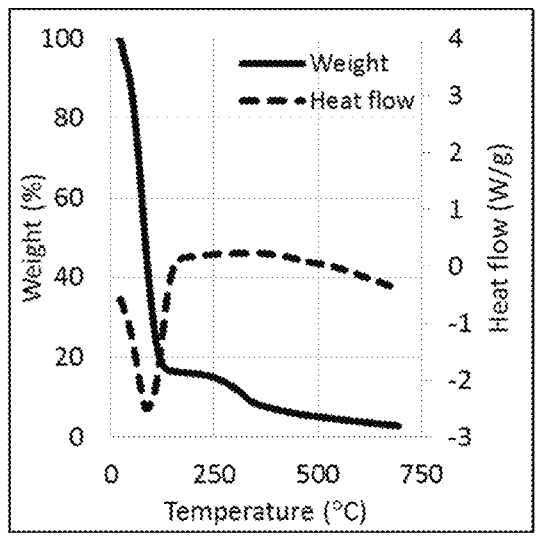
FIG. 9 shows a DSC (heat flow) and TGA (weight) scans of human feces (9A) in nitrogen and in air (9B). The comparison shows oxidation reactions occuring in air but not in nitrogen.
Figure 9:
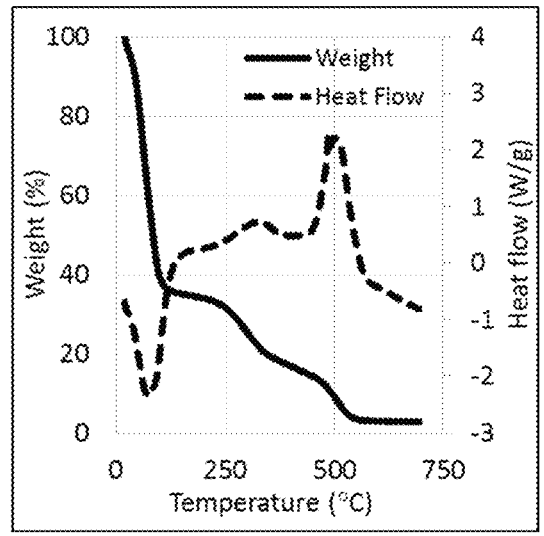

Thermogravimetric (TGA) and differential scanning calorimetry (DSC) scans of human feces are shown in FIG. 9. TGA scans show that heating of human feces in either nitrogen and air atmospheres leads to significant mass loss in the 50 to 120° C. range that can be attributed to water evaporation. This is an endothermic step as shown by the drop in heat flow in the DSC curve.

Mass loss in the higher temperature range of 250–400° C. shows a very broad, almost indistinct exothermic effect in nitrogen and a more substantial and distinct exotherm in air. The difference is the result of substantial moisture content and low caloric content of the sample tested in nitrogen. In the results of the sample treated in air (FIG. 9b) an additional oxidation signal is present at 450-600° C., which is in good agreement with the data obtained from dog feces. It can be seen that although similar mass losses are observed in pyrolysis and oxidation, the latter is much more exothermic.

Characteristics of Semi-Continuous Smoldering and Post-Smoldering Catalytic Oxidation Semi-Continuous Smoldering The inventors previously reported batch smoldering of surrogate fecal matter in batch vertical columns (Cheng 2015; Yerman et al., 2015; Yerman et al., 2016). While batch smoldering operations are relatively simple, in the context of a household off-grid sanitation solution, discharging residual contents of the column (media and ash) in whole or in part, refilling with fresh medium/fuel mixture and re-ignition of the new batch is required. In addition, the reactor and other thermally connected attachments of the system will cool to ambient temperatures between runs and require additional energy to reheat and ignite for each new run, increasing the energy input requirement. A continuous process requires only the initial ignition.

Figure 10:
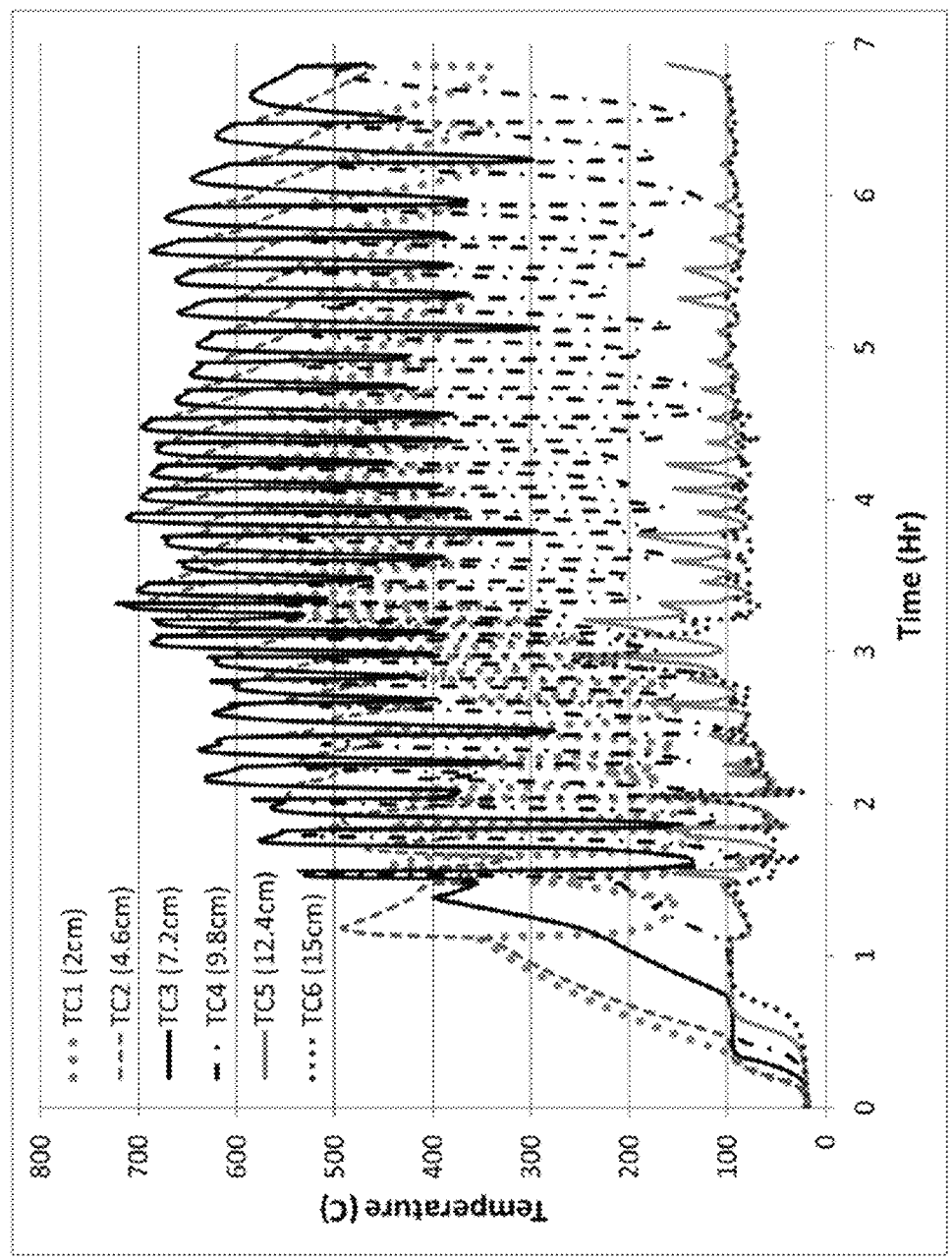
FIG. 10 shows temperature scans as recorded by thermocouples within the smoldering reactor during a typical smoldering run. The scans show that thermocouples within the column reactor record temperatures that cycle repeatedly as the reactor operation is cycled through smoldering and bed drop in each cycle.

A typical set of temperature recordings from thermocouples located in the reactor for semi-continuous removal of spent media from the bottom of the reactor and feed of raw fuel mixed with media to the top of the column is shown in FIG. 10. Each curve gives the temperature vs time history at the centre line of the reactor at a prescribed vertical position.

The bed height in the reactor is equivalent to 7 cycles. With 28 cycles shown in FIG. 10, and many more that were run, it is demonstrated that smoldering can proceed well beyond the initial loading of fuel without additional input of energy after the initial ignition.

The bed drop is achieved such that the smoldering front moves down as a plug in a smooth vertical motion and therefore remains undisturbed (minimum axial dispersion). The down flowing solids (thermal medium plus residual ash) are discharged through the turn table and the reactor is replenished with an equivalent amount of medium mixed with fresh fuel. Since the smoldering front and much of the packed the bed remains hot during the short media discharge and bed drop operation, smoldering is re-initiated as soon as air is turned back on, and the newly fed mixture is dried in situ, pyrolyzed and smoldered as it moves down the column in subsequent cycles. This cyclic operation can continue as long as smoldering is sustained.

Figure 11:
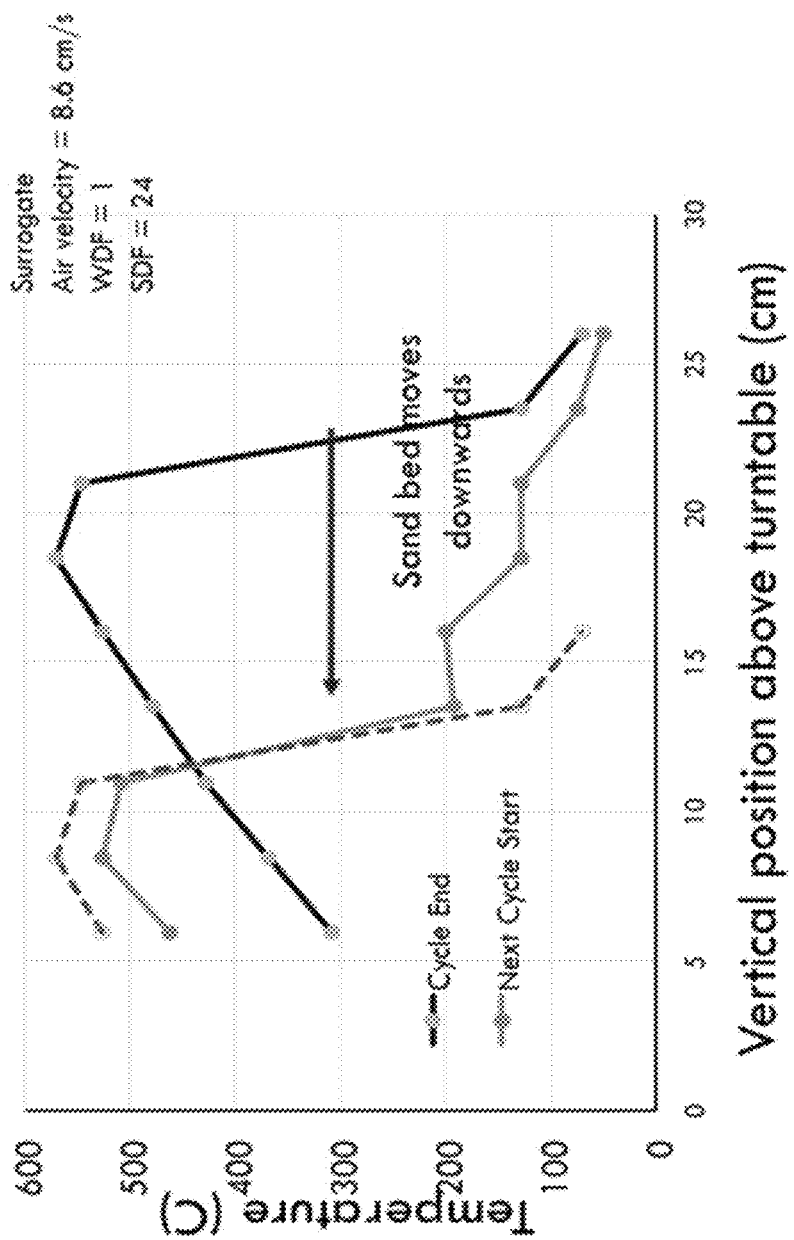
FIG. 11 shows that the axial temperature profile is preserved, and shifted downwards during a bed drop.

FIG. 11 shows the axial temperature profile in the reactor immediately before and after a typical bed drop. The use of a turntable as the media discharge mechanism was chosen to ensure that the smoldering front remains uniform as the bed drop takes place. Shifting the before discharge and bed drop temperature profile to reflect the downwards motion of the discharge/bed drop steps shows that the "before" temperature profile is largely preserved in the "after" temperature profile, especially at the lower bed heights. The deviation at higher bed heights is reflective of the new feed that has been added to the top of the column.

Smoldering Column Temperatures

Figure 12:
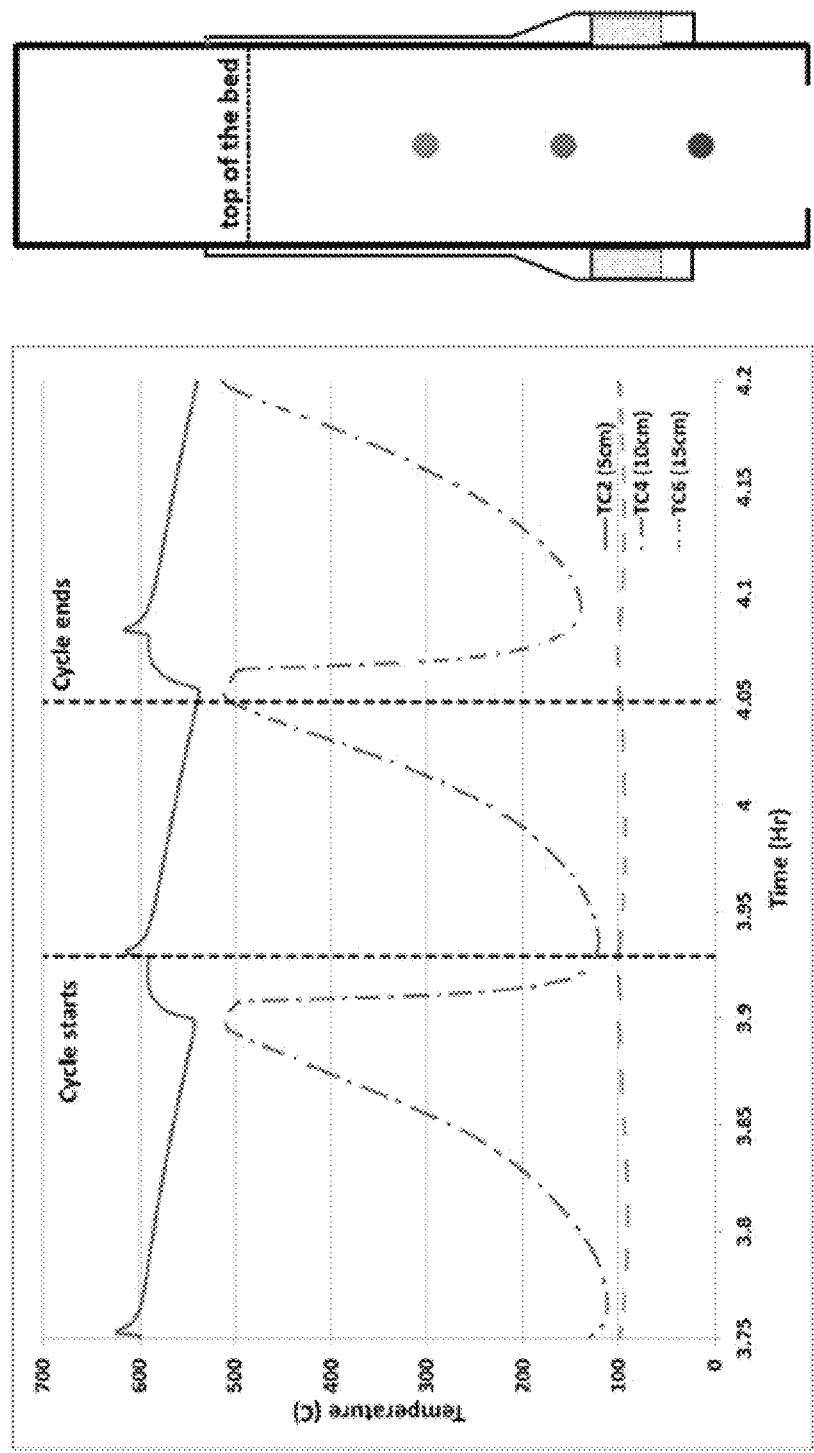
FIG. 12 shows a typical axial temperature profile at the centreline of the reactor. The smoldering front moves typically between z=4 cm to z=7 cm in a typical cycle between bed drops.

FIG. 12 shows the temperature readings at three of thermocouples during a typical smoldering experiment. Four typical cycles long after the start up stage when the effect of the added ignition energy from the external heater is diminished are shown. Readings from other thermocouples are suppressed in this graph for easier visualization.

During each cycle, the smoldering front moves from just below TC2 (=4.6 cm above the base) to TC3 (=7.2 cm above the base). Correspondingly, the temperature at TC2 is high—approximately 500° C. in this example at the start of a cycle, and decreases gradually as the smoldering front moves upward and past the TC2 position. At the end of the cycle, the TC2 temperature increases quickly when hotter media/fuel closer to the smoldering front is lowered as the bed drop protocol is executed. The increase occurs over a short but finite amount of time corresponding to the time required to execute the bed drop.

Similarly, the temperature at TC3 increases during a cycle as the smoldering front moves upwards and approaches this location during a cycle, and decreases when the bed drop to initiate the next cycle is executed. TC6 (=15 cm above the base) is near the top of the packed bed and shows a nearly constant 100° C. throughout the four cycles. The smoldering front never approaches this height, therefore the temperature at this position remains relatively cool. A feature of smoldering is that because of the temperature profile that exists in the smoldering bed, there are zones above the smoldering front that are high enough in temperature to pre-heat the fuel mixture and to evaporate water in the mixture. The nearly constant 100° C. at TC6 indicates that liquid water in the wet fuel/media mixture and water vapor are in equilibrium, or that drying or water evaporation is occurring at or near this position.

Reactor Design: Post-Catalytic Oxidation and In Situ Drying with Semi-Continuous Smoldering The eggshell platinum catalyst requires a temperature of 280° C. or higher, with optimal operating temperature in the range of 500° C. to 650° C. The reactor used in this study has been designed to facilitate synergy between smoldering and catalytic oxidation processes. The proximity of the catalyst module to the electric band heater facilitates the simultaneous pre-heating of the catalyst and the smoldering reaction mass. FIG. 10, shows that during the start-up stage when an external band heater is used to preheat the smoldering reaction mass to its ignition temperature, the catalyst is also being heated to above its light off temperature. Once air flow is initiated and smoldering is ignited, and volatilized gases are produced above the smoldering zone, the catalyst in the catalyst module is already at a high enough temperature to catalyze the oxidation of CO and hydrocarbons in smoldering emission stream.

Figure 13:
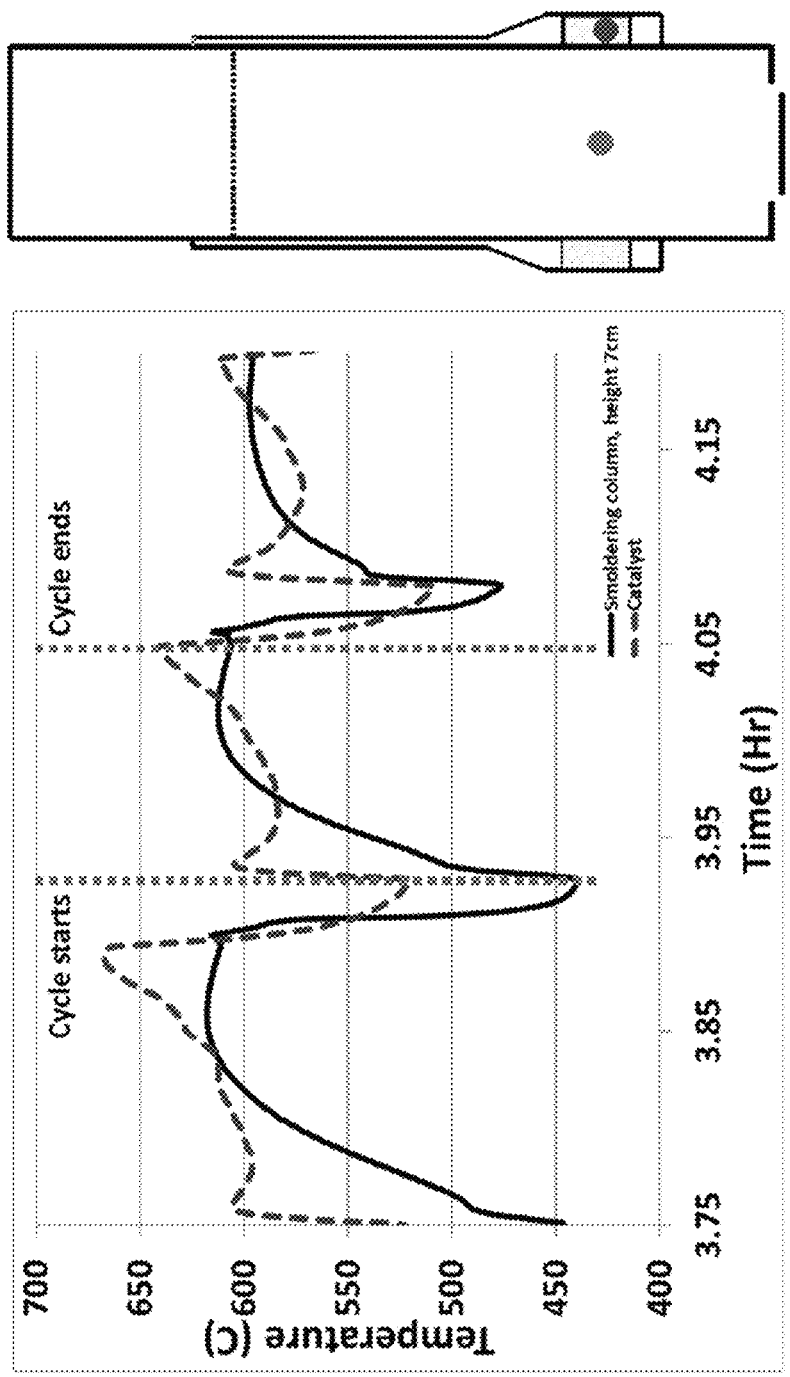
FIG. 13 shows a typical centerline temperature profile in the smoldering column (7 cm above the base) and center of the catalyst doughnut shows the synchronicity between smoldering column and catalyst temperatures in 3 consecutive cycles.

The reactor has also been designed with the catalyst module wrapped around the smoldering column at approximately the same vertical position as the smoldering zone. FIG. 13 shows the temperature scans in the catalyst bed and the smoldering bed at approximately the same vertical position over three typical cycles. Temperatures at TC2 in the smoldering zone increases with time in the early part of the cycle as the smoldering front approaches, but remains largely within the smoldering zone for the rest of the cycle at a nearly constant temperature until air is turned off and media discharge/bed drop is executed. The temperature in the catalyst bed increases sharply when air is turned on at the start of a cycle and the flow of post smoldering flue gas is re-initiated, sending reaction substrates to the catalyst module. Catalyst temperatures vary somewhat throughout a cycle, possibly due to non-uniform fuel compositions during the cycle. An upward trend is often seen towards the end of each cycle, a plausible explanation is that as the smoldering front moves upwards, there is less fuel above the front to be pre-dried, thus gas stream flowing to the catalyst is richer in fuel and leaner in water vapor. When air flow is turned off and the flow of smoldering emissions stops, catalyst temperature also drop as expected. At different times in the cycle, catalyst temperature can be either higher or lower than the smoldering bed temperature, so that heat transfer can be in either direction.

Figure 14:
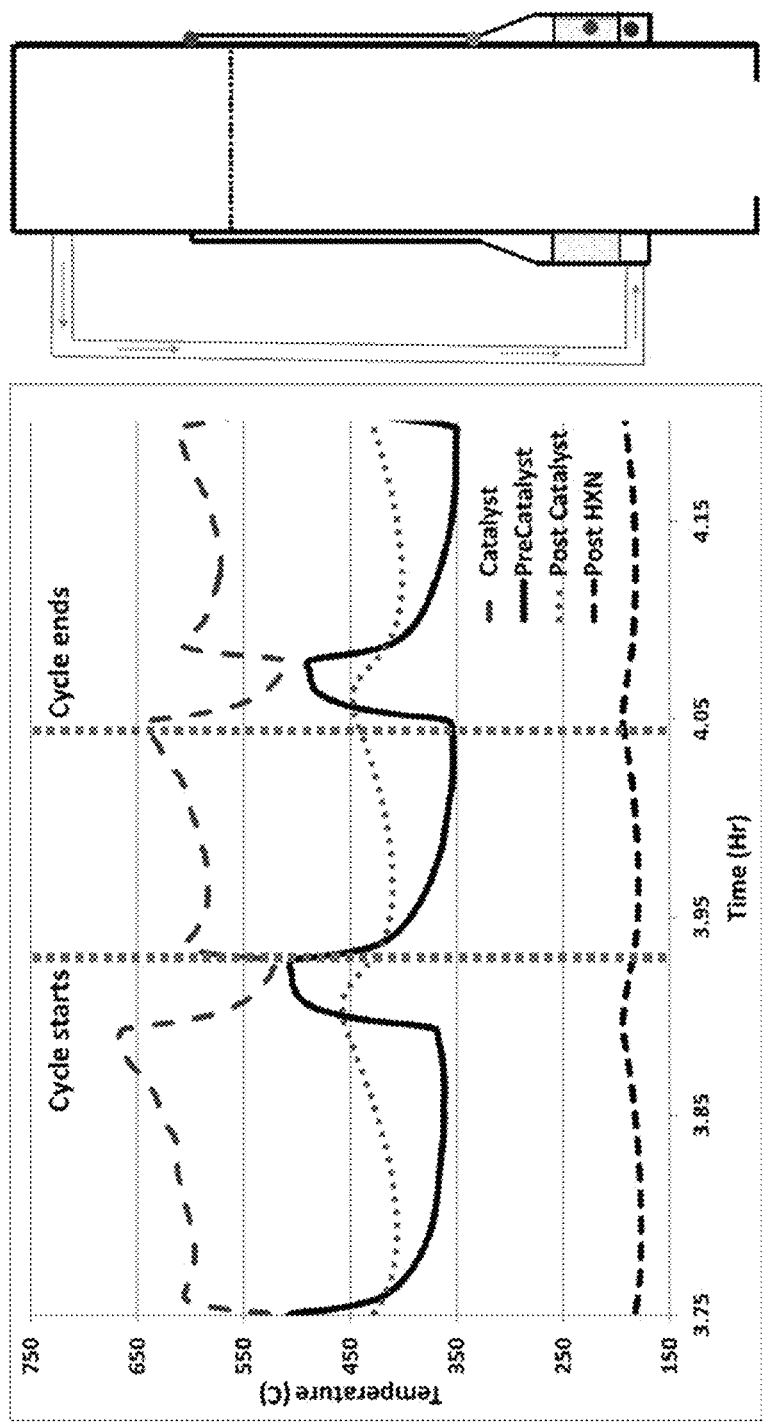
FIG. 14 shows typical temperature profiles in the catalyst annulus over 3 consecutive cycles.

To take advantage of the hot post-catalyst emissions, a heat exchanger jacket was incorporated into the reactor design wrapped around the smoldering column above the catalyst module. Thermocouples were placed just before within, and after the catalyst bed, and after the heat exchanger just before the emissions is directed towards the exit exhaust. FIG. 14 shows the temperature scans at these thermocouple locations, and a number of observations can be made:

1. The catalyst and pre-catalyst temperatures diverge during the catalytically reacting stages of each cycle when exothermic reactions are occurring in the catalyst, and converge during non-reacting stages of each cycle due to heat transfer.

2. The pre-catalyst temperature is at approximately 400° C. during the reacting stages. The design provides significant pre-heating of the smoldering off-gas at the bottom of the reactor before it flows into the catalyst module.

3. The exothermic heat of reaction in the catalyst bed catalyst further increases the temperature to as high as 650° C. The temperature increase is indicative of heat generation due to reaction.

4. Temperature of the post-catalytic exhaust decreases as it flows upwards from the catalyst bed, transferring heat to the smoldering column to pre-heat and dry the un-smoldered fuel/media mixture in the higher sections of the column. The amount of energy transferred enough that the gas temperature at the top of the heat exchanger section is significantly lower than the catalyst bed temperature—between about 180° C. and 230° C. in the example given in FIG. 14. Efficient insulation wrapped around the catalyst and heat exchanger jacket ensures that the direction of the heat transfer is mainly inward toward the reactor and not to the environment.

Figure 15:
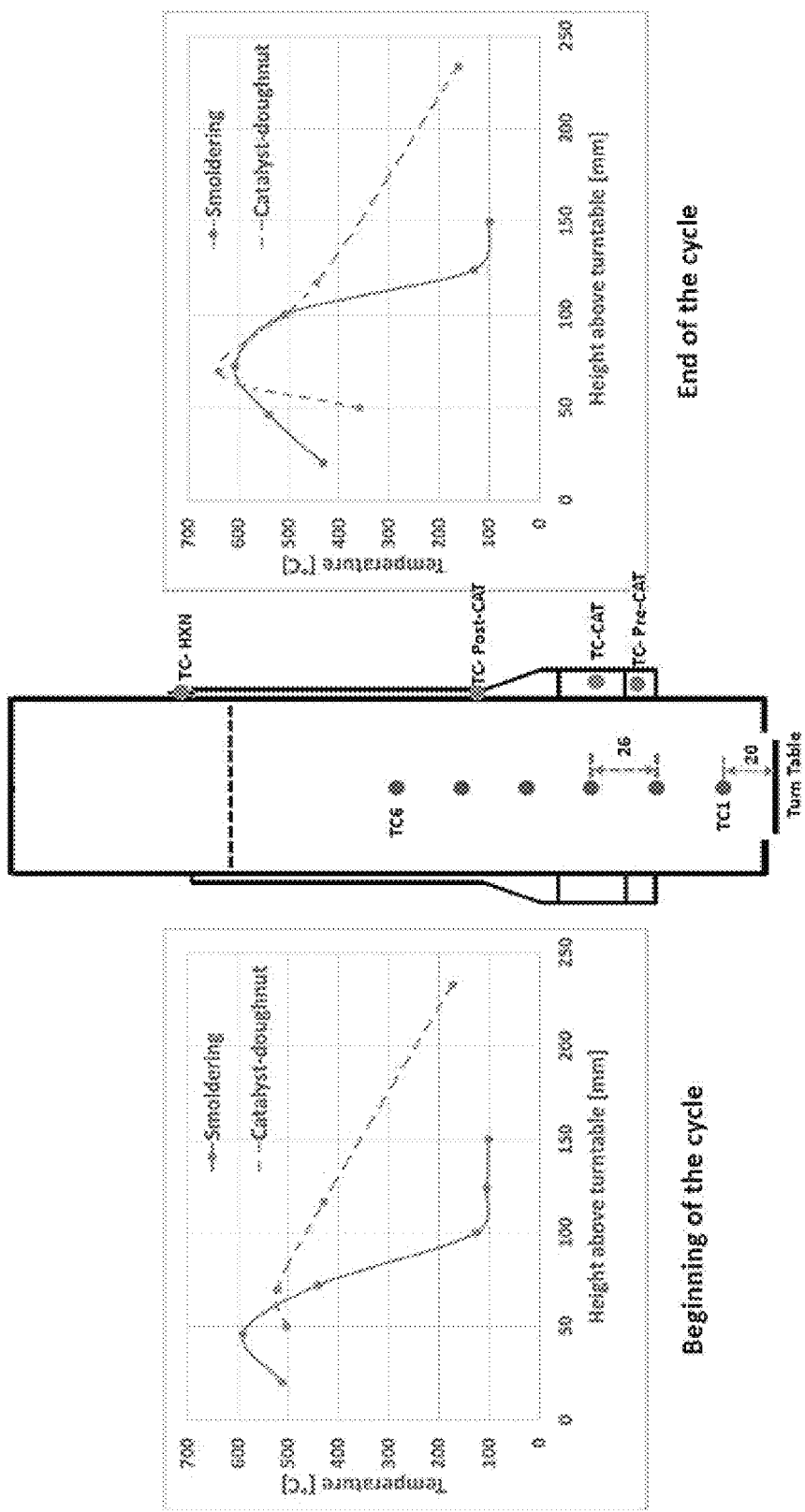
FIG. 15 shows typical temperature measurements at different heights from the turntable inside the smoldering column and in the catalyst and heat exchanger jacket at the beginning and the end of a typical smoldering cycle.

An example of axial temperature profiles in the smoldering column vs in the catalyst and heat exchanger modules are shown in FIG. 15, further demonstrating the driving force for heat transfer from post-catalyst emissions toward the smoldering column to provide heat for in situ drying of incoming fuel.

Effect of Operating Variables on Reactor Performance

Experimental variables that are important to the operation of a combined smoldering/catalytic oxidation process include: WDF, airflow rate, choice of media and MDF. And although the choice of column diameter cannot be changed once a system has been constructed, it also influences the performance of a sanitation system—particularly in the rate at which feces can be processed. The influence of each of these parameters on the smoldering/catalytic performance and the limits of process sustainability are described below.

WDF

WDF, or water to dry fuel mass ratio, is a key parameter in smoldering. The dry fuel mass provides heat when reacted, while the mass of water in the inlet fuel requires heat to dry. While keeping air flow rate and MDF constant, and varying WDF in either surrogate or human feces, the reactor peak temperature over multiple cycles of the same WDF was averaged and plotted against MDF in FIG. 16a. Peak reactor temperature decreases with increasing WDF in the inlet fuel, as more of the heat or reaction is required to evaporate the water content in the inlet fuel. FIG. 16b shows the relationship between the fecal destruction rate (FDR) and WDF of the feed fuel. FDR is calculated from the smoldering velocity—the rate of propagation of the smoldering front, the reactor dimensions and the dry fuel content in the reactor. It can be seen that FDR decreases with increasing WDF—another indication of the energy cost associated with evaporating water from high WDF fuel.

Figure 16:
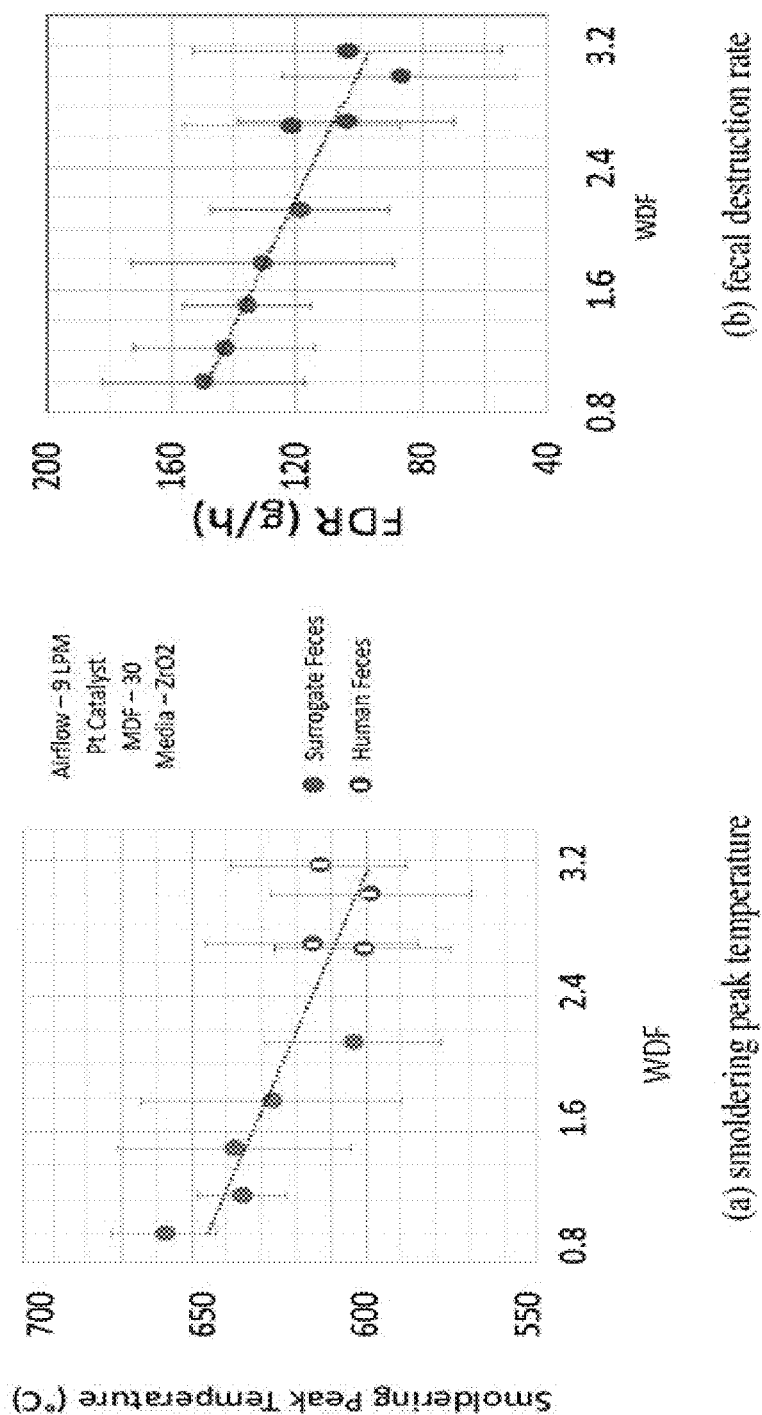
FIG. 16 shows the effect of inlet fuel water to dry feces ratio (WDF) on (16a) smoldering peak temperature and (16b) fecal destruction rate. Each data point represents a minimum of 5 cycles, with standard deviations as shown.

FIG. 16 includes data for surrogate fuel up to WDF of 2.25, and human feces of WDF between 2.7 and 3.2. The surrogate fuel composition used in this study could not be formulated with WDF above 2.25. Remarkably, in previous work on batch smoldering, the highest WDF that could be sustainably smoldered under similar conditions was approximately 2 (Cheng 2015, Yerman 2016). Healthy human feces has a WDF of approximately 3, with the moisture content being correlated to the Bristol scale. With enhanced heat generation from the catalytic converter, and the heat exchanger design to enhance in situ drying of fuel, the process described herein is capable of accepting full moisture content healthy human feces with no separate drying equipment or a separate drying step which are typically slow and can be energy intensive.

Air Flow Rate

Figure 17:
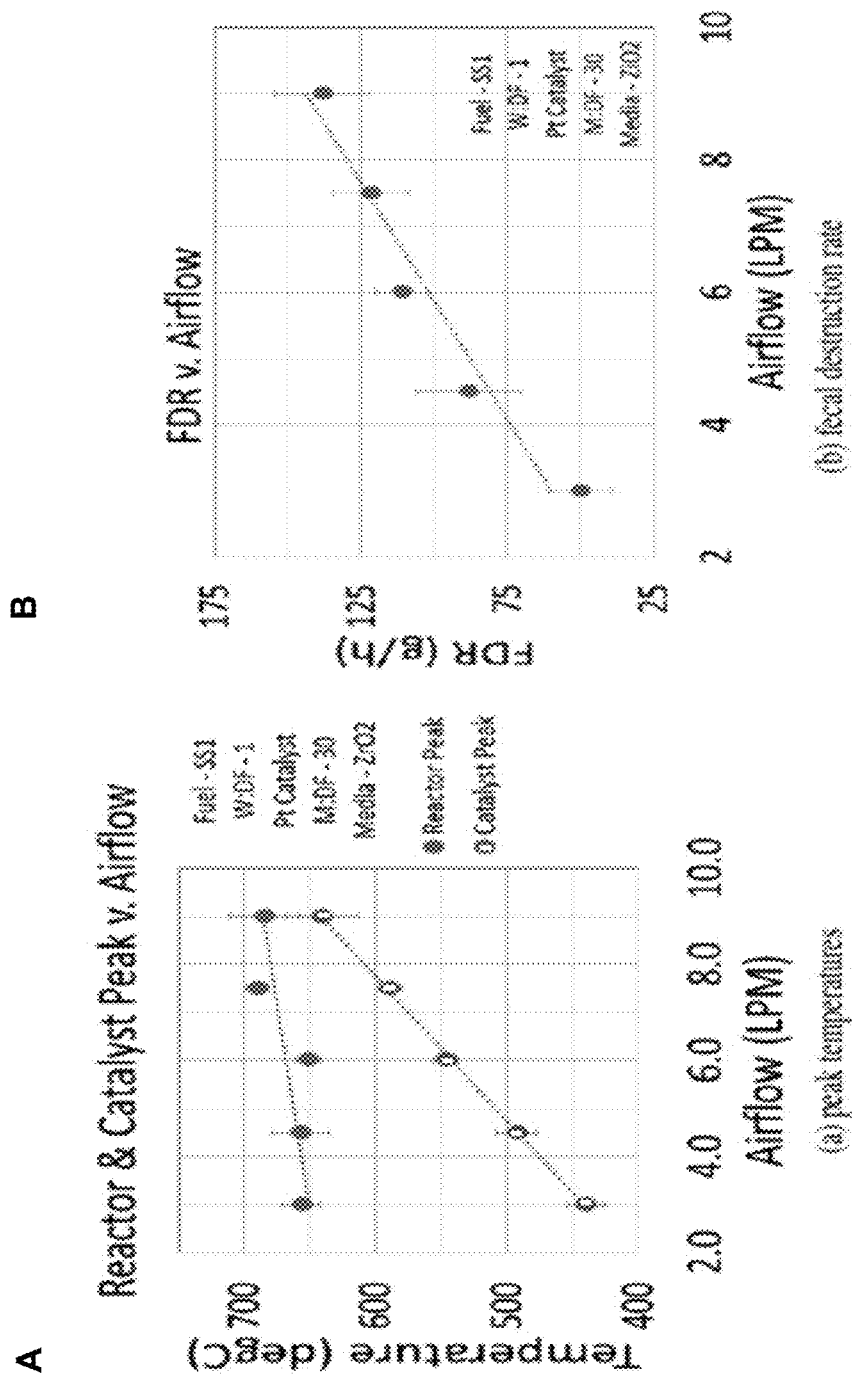
FIG. 17 shows the effect of air flow rate on smoldering peak temperature and catalyst temperature (17A), and on fecal destruction rate (FDR) (18B). Each data point represents a minimum of 5 cycles, with standard deviations as shown.

Air flow rate is the main operating parameter for controlling fecal destruction rate, which is essential for responding to variable input in a household sanitation system. FIG. 17a shows the peak smoldering temperatures and catalyst temperatures as a function of air flow rate. In this range of air flow rates, increasing air flow rate increases the rate of oxygen delivery to char, and hence the rate of reaction in the smoldering zone to give rise to increased peak smoldering temperature. Catalyst temperature shows an even stronger dependence on air flow rate. With increasing air flow rate, FDR in the smoldering column increases, and the rate at which post-smoldering gaseous emissions flow to the catalyst module increases—giving the catalyst module higher feed rate of substrate.

FIG. 17b shows the effect of air flow rate on FDR. The linear relationship between FDR and air flowrate shown is consistent with self-sustaining smoldering under otherwise constant conditions that have been reported previously [Cheng 2015, Yerman 2016]. The lowest point in FIG. 17b, shown as a hollow circle, is a condition which did not give rise to self-sustaining smoldering. Non-sustainable smoldering is manifested during experiments as a downward trend in temperatures over until peak smoldering temperature drops below a sustainable level. In theory, there is also an upper limit for the air flow rate above which smoldering/catalysis will become unsustainable due to cooling. However this upper limit is beyond the expected operating range. Within the sustainable smoldering range, air flowrate can be varied as part of a control strategy to vary FDR in response to variations in user input.

MDF

Figure 18:
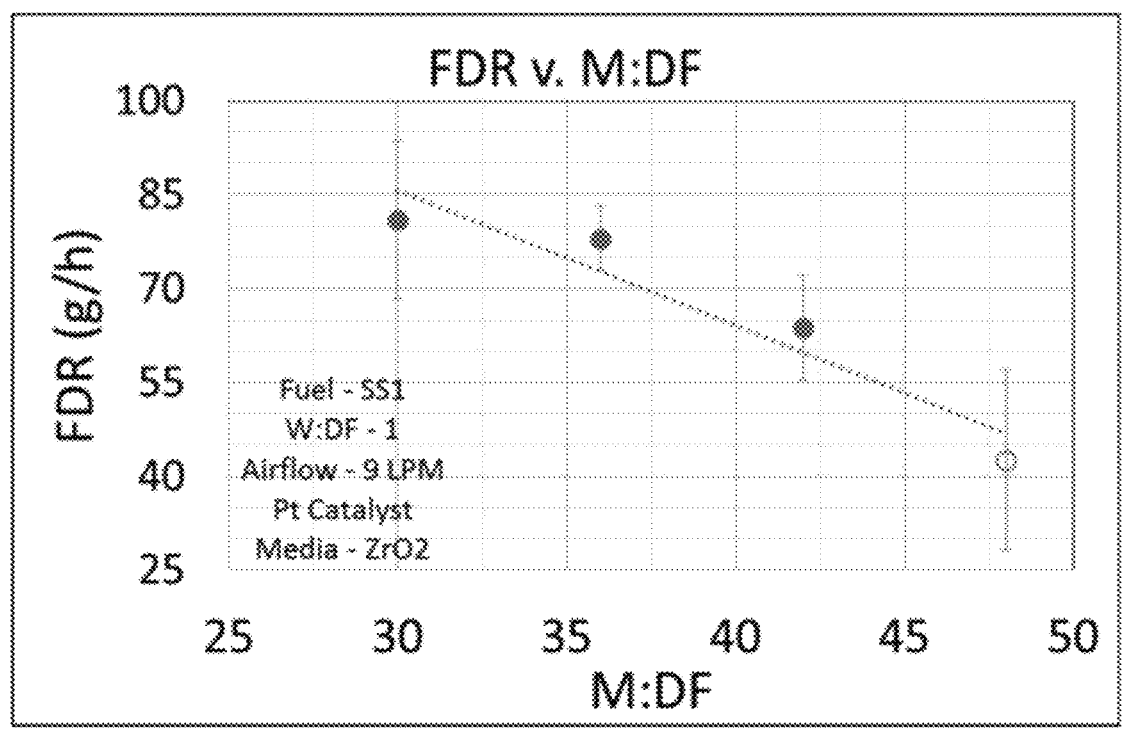
FIG. 18 shows that the ratio in which fuel is mixed with media affects the fecal destruction rate. There is a limit in how dilute the fuel can be in the mixture for sustainable smoldering which is shown by a hollow circle.

The value of MDF, or media to dry fuel mass ratio, determines the concentration of fuel in the column, as well as the ratio of the reaction caloric content to the thermal mass in which the heat of reaction can propagate and distribute. As shown in FIG. 18, FDR decreases as MDF increases or fuel concentration decreases as expected. At beyond a certain value of MDF, fuel in the mixture becomes too dilute and smoldering becomes unsustainable as shown by a hollow circle in FIG. 18. Although not seen in the range of MDF examined in this study, in principle too low a value of MDF will also result in non-sustainable smoldering due to reduced porosity and insufficient surface area between fuel and oxygen.

In the application of smoldering/catalysis processes as part of an off-grid sanitation system, MDF is not a convenient variable for controlling FDR during operation. However, the wide range of MDF over which sustainable smoldering is observed allows for some tolerance in the precision of feces and medium input.

Media

Figure 19:
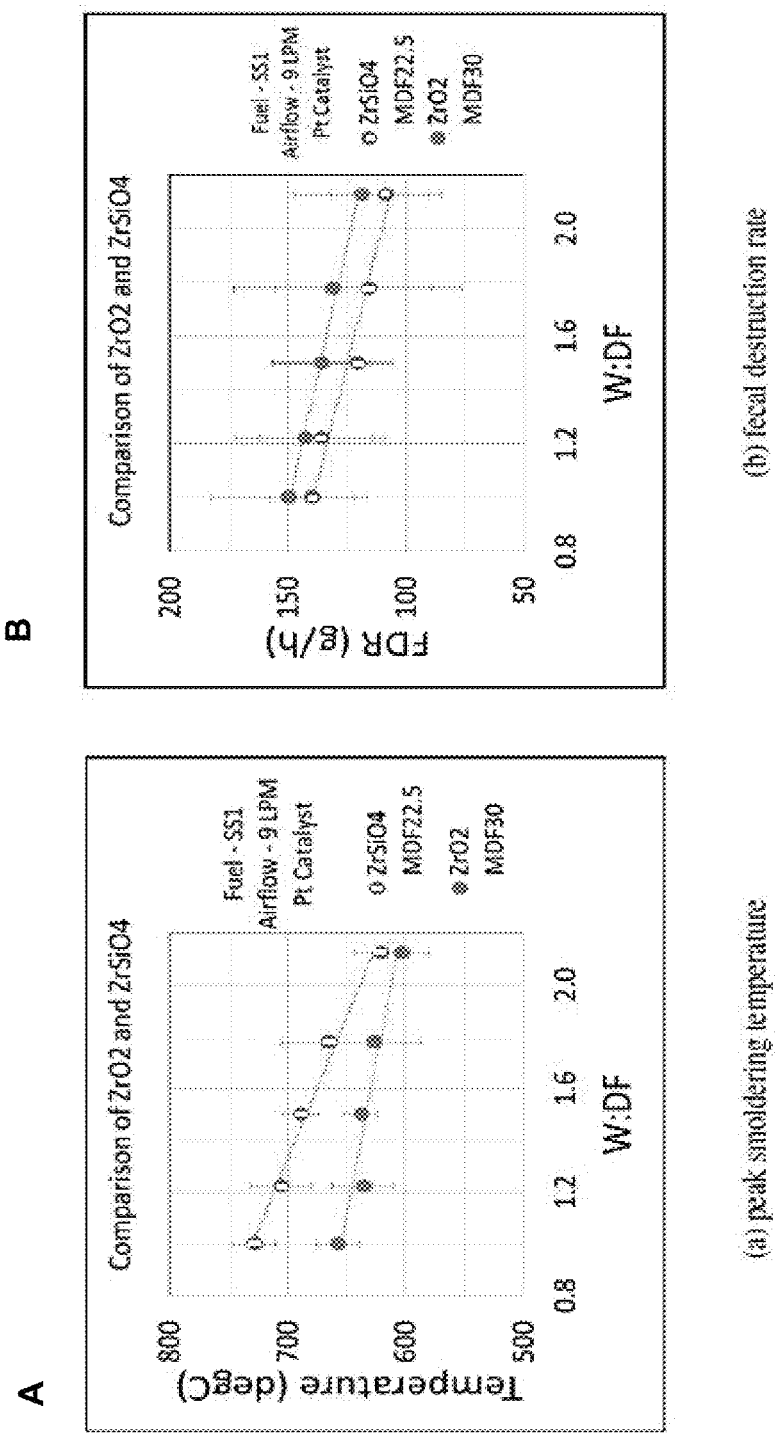
FIG. 19 shows the comparison of the peak smoldering temperature (19A) and fecal destruction rate (19B) for smoldering surrogate feces mixed with two different media at various moisture contents.

Zirconium oxide (surface coated with 3% MgO) and zirconium silicate are two candidate media alternatives to sand investigated in the present example. Both showed no detectable attrition when subjected to simulated mixing and thermal shock stresses. While most of the experiments reported in this herein have been on zirconium oxide, FIG. 19 shows a comparison of the peak smoldering temperatures and FDR obtained from smoldering surrogate feces mixed with the two media at various WDF—using different MDFs for the two media to give the same fuel concentration in the packed bed. FIG. 19a shows that peak smoldering temperatures are higher with zirconium silicate but converges to the peak temperatures with zirconium oxide at higher WDF which are more relevant to our application. Fecal destruction rate, as plotted in FIG. 19b for the two media are comparable with the values for zirconium silicate being slightly lower. These results demonstrate that different media can be used to achieve comparable smoldering performance. Preliminary evidence suggests that zirconium oxide core of the MgO coated zirconia particles may undergo a phase transformation when subjected to smoldering temperatures, while zirconium silicate remains phase stable within this range. Ongoing evaluation with zirconium silicate shows that the trends observed with zirconium oxide also apply for zirconium silicate.

Catalytic Conversion

Figure 20:
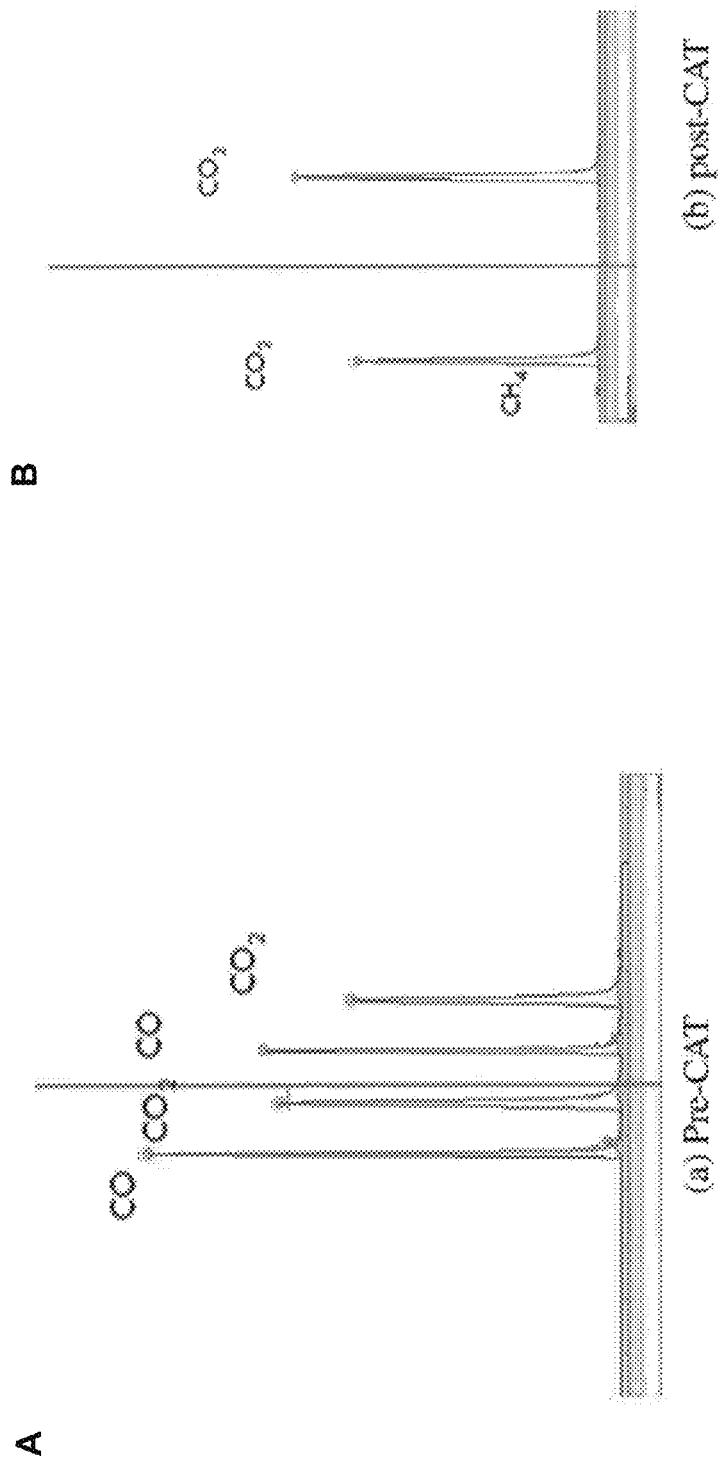
FIG. 20 shows gas chromatograms of smoldering flue gas before (20A) (2 runs) and after (20B) catalysis. CO concentration decreases from before to nearly undetectable after catalysis.

More thorough and systematic probing of gas samples pre- and post-catalytic module as a function of experimental parameters is ongoing. Preliminary results, however, show the potential of the catalytic module to mitigate undesirable emissions from the overall process. FIG. 20 shows gas chromatograms obtained from four samples of smoldering flue gases. Two of the samples are taken before the catalyst bed through a bypass valve (FIG. 20a) and the other two after the catalyst (FIG. 20b). The chromatogram shows peaks obtained for CO, $CO_2$ and $CH_4$. As evidenced by the absence of CO peak in post-catalyst chromatograms, the catalyst has fully oxidized the CO in smoldering flue gases. Small amount of $CH_4$ remain in the post-catalyst gas. Conversion levels of over 90% were achieved in the experiments conducted in this study.

The GC evidence is consistent with thermocouple measurements. Oxidation of flue gases over the catalyst is exothermic and causes a significant temperature rise across the catalyst bed. FIG. 14 showed this exothermic effect for three consecutive cycles during which the catalyst bed temperature rises by between 200° C. to 300° C. For high rates of fecal destruction, additional (auxiliary) air may be needed upstream of the catalyst to allow complete oxidation of the catalyst, which can result in even higher conversion and larger temperature rise across the catalyst bed.

Summary and Conclusions

The inventors have demonstrated:

1. The turntable mechanism for discharging media maintains a uniform temperature profile in the smoldering bed, and can be used to operate smoldering in a continuous manner.

2. Post-smoldering catalytic module allows for further conversion of volatilized fecal fuel, with enhanced heat generation and significant mitigation of undesirable gaseous components.

3. Post-catalyst emissions can be used to provide enhanced heating and drying to the fuel above the smoldering front in the reactor.

4. Zirconium silicate and zirconium oxide can be used as alternatives to sand as pore forming media for smoldering, and the thermal performance of these media are comparable when the fuel concentration in the packed bed is maintained constant.

5. The dependences of (a) FDR and (b) smoldering peak temperatures on air flow rate and WDF with catalytic conversion are qualitatively the same as past smoldering studies without catalytic conversion.

The implications for household scale sanitation are:
1. FDR can be controlled by varying air flow rate, allowing for control strategies that respond to input rate in a household.
2. The fact that full moisture content human feces could be fed directly into our reactor and smoldered sustainably provides a significant process advantage. No separate drying equipment is required, and no additional time-consuming and energy intensive drying step is required.
3. At 9 LPM air flow and with full moisture content WDF human feces, the FDR achieved in the 75 cm diameter column used in this study was about 100 g/h of dry fecal mass. For a 10 person household, the average input rate is about 30 g/h. Further reduction in fecal destruction rate can be achieved with lower air flowrates, and by using a smaller diameter column. In the ideal limit in which wall effects are negligible, smoldering velocity is linearly proportional to the superficial air velocity, and FDR is proportional to air flow rate. FDR therefore scales with column cross-sectional area if air velocity is kept constant. Additional data (not shown) using 2.5 inch and 2 inch diameter reactors indicate that the quantitative smoldering results in the 3 inch columns are transferrable to 2.5 inch columns, but that wall effects become significant in 2 inch columns. With a 2.5 inch diameter column, full moisture content human feces FDR at the same air velocity would be reduced to 70 g/h. With further optimization with air flow rate and MDF, FDR of 30 g/h and below is achievable, making this technology suitable for a household scale system.

Example 2: Use of Auxiliary Air for Catalysis

Smoldering Fecal Destruction Rate

There is an observed experimental relationship between fecal destruction rate in the smoldering reactor and air flow rate. Controlling the air flow rate, also controls the fecal destruction rate via smoldering in the smoldering reactor.

The fecal destruction rate in the smoldering reactor refers to the rate at which feces has been either pyrolyzed or combusted in the smoldering reactor. The volatilized compounds produced from pyrolysis have not necessarily been completely converted.

Stoichiometric Ratio of Oxygen and Fecal Fuel

To complete the reaction of fuel with oxygen, a stoichiometric amount of oxygen is needed. For example for methane reacting with oxygen:

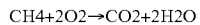

$$CH_4 + 2O_2 \rightarrow CO_2 + 2H_2O$$

Two moles of oxygen are needed for every mole of $CH_4$. If the fuel includes compounds other than hydrocarbons, such as nitrogen containing compounds, analogous stoichiometrically balanced reactions between each compound and oxygen can be written.

Feces is a complex mixture of many chemical compounds. The inventors estimated the atomic composition of fecal matter and the range of required stoichiometric amounts of oxygen that needs to be fed into a reactor for a given mass of feces processed.

For a continuous process, this translates to liters per minute (LPM) of oxygen, or air flow rate (LPM) needed for a given fecal destruction rate. The stoichiometric oxygen requirement for a given fecal destruction rate may be more than the experimentally observed air flow rate needed to achieve the smoldering fecal destruction rate. Smoldering fecal destruction rate (FDR) is calculated based on the smoldering velocity and the fecal content within the smoldering column reactor. It does not account for incomplete conversion to $CO_2$ of the gaseous products of smoldering, and thus the air flow rate needed to achieve a given FDR is lower than the stoichiometric required to reach complete conversion.

FIG. 21 shows a comparison of the experimentally observed air flow rate vs smoldering fecal destruction rate (under a particular set of conditions) for a range of possible fecal compositions (indicated as "theoretical").

The gap between the experimental vs theoretical lines shown in FIG. 21 is the amount of auxiliary oxygen needed to ensure there is enough oxygen in the catalyst region to completely convert the remaining unconverted fuel. This analysis indicates that at low fecal destruction rates, there is sufficient oxygen in the smoldering air flow to meet stoichiometric requirements, but at higher FDR, the smoldering air flow is below stoichiometric requirement and that auxiliary oxygen would be needed in the catalyst region.

The methods and devices described herein therefore optionally include the input of auxiliary air (oxygen) into the catalyst zone.

FIG. 22 shows gas chromatograms post catalysis indicating that oxygen peaks are very low, or that oxygen is depleted. Correspondingly, CO peaks are significant.

FIG. 23 shows ratio of CO/CO2 in post-catalyst exist stream vs WDF (water to dry feces) for no auxiliary air vs with auxiliary air. Results show increased conversion to CO2, or lower CO/CO2 in the presence of auxiliary air, demonstrating that auxiliary oxygen enhanced CO conversion in the catalyst module.

Example 3: Testing of a Smoldering/Catalytic Conversion Reactor

An additional smoldering/catalytic conversion reactor as shown in FIG. 26 was designed and tested. The design of the reactor was similar to the reactor used in Example 1, except the length of the column reactor, annular heat exchanger jacket and catalytic conversion reactor were increased while the width of the column reactor remained 3 inches. Thermal sensors (thermocouples) were included at a number of different positions in the device indicated by the circles shown in FIG. 26 to generate position-specific thermal data during operation of the device.

Smoldering was initiated by heating a section of the column reactor containing a mixture of human feces with a moisture content of between 90% and 82% and thermal media (zirconium silicate). FIG. 27 shows the temperature at 6 different positions during a smoldering run of nearly 14 hours.

Generally, the highest temperatures were observed at the thermocouple within the column reactor in the smoldering zone (TC3A). Lower temperatures were observed (in decreasing order) at the bottom of the catalytic reactor (CAT1); the top of the catalytic reactor (CAT2) and before entry into the catalytic reactor (Pre-CAT). The lowest temperatures were observed at the top of the heat-exchanging jacket (Post-HXN) indicative of significant heat transfer towards the fuel within the column reactor.

The temperature variations at each of the different positions remained relatively consistent over the length of the run. The reactor was able to effectively treat fecal matter with a relatively high moisture content (~80%) over nearly a 14 hour period without any significant thermal deviations that may be indicative of a loss of performance. The temperature recorded by TC3A, located within the prescribed smoldering zone shows cyclic behavior, indicative of the cyclic reactor operation. At the beginning of each cycle, air is introduced, and the smoldering front propagates upwards and the temperature at TC3A increases. At the end of the cycle, air flow is topped, smoldered media is discharged, new fecal material is introduced and mixed with recycled media in situ. The bed drop that results due to the material transport results in a drop in temperature at TC3A. Fecal material is widely variable, and large variations in performance are expected. As the cycles repeat, the temperature scans repeat in a substantially similar manner—subject to some expected variability, showing that there is no significant thermal deviation that may be indicative of loss of thermal performance. FIG. 27 also shows temperature recorded by thermocouples in the catalyst module, pre- and post-catalyst locations, and the temperature after the heat exchanger. Each of these scans also show cyclic behavior, but in less pronounced ways than TC3A. The different stages represent changes in the moisture content of the input feces, and how the temperatures react to these changes. In each case, shifts in peak temperature can be seen, but largely repeatable cycles result. The repeatable cycles show that as long as new fecal material or fuel is fed to the reactor, smoldering can proceed in this cyclic fashion with no additional input of heat. Thus energy requirement for re-ignition is not required.

Example 4: Catalytic Treatment of Post-Smoldering Gases

Additional experiments were performed to assess the catalytic treatment of volatile gases generated by smoldering feces in a column reactor. An external catalytic converter cartridge was used as a possible and simplest embodiment of the smoldering/catalysis combination.

The reactor was used to smolder surrogate feces and dog feces, alternatives for human feces, at a water to dry feces ratio of 1 with an airflow between 4 to 6 LPM in a cyclic batch operation. The post-smoldering gases flow upward exiting the reactor at the top and entering the catalyst cartridge from below where they are catalytically treated prior to being vented to the atmosphere. A heater was used to heat the catalytic cartridge to 400° C. prior to the start of smoldering cycles so that the catalysts would be active for converting post-smoldering gases. FIG. 28B shows a typical temperature scans for thermal sensors located within the reactor (TC6) and within the external catalyst cartridge (TC7). The rise in the temperature of the catalyst as the smoldering cycle progresses demonstrates generation of heat from the catalytic processing of post-smoldering flue gases.

Example 5: Removal of Smoldered Media Using a Turntable and Collection Unit

The inventors have determined that the use of a turntable positioned at the bottom of the column reactor is effective for removing smoldered media. In particular, the use of a turntable allows for the continuous or semi-continuous operation of the reactor and facilitates removal of the smoldered fuel mixture while maintaining a uniform smoldering front within the column reactor. Smoldered fuel mixture removed from the column reactor can then be collected and separated into recycled thermal media and residual ash.

FIG. 29 shows one embodiment of turntable and a collection unit that were designed and tested for the removal and collection of smoldered fuel mixture. In the tested embodiment, column reactor had a diameter of 74 mm, the turntable had a diameter of 105 mm and there was a 5 mm gap between the bottom end of the column reactor and the turntable to allow for the discharge of smoldered fuel mixture. The turntable was connected to a rotating shaft extending through the collection unit. As shown in FIG. 29, the collection unit had a conical shape such that smoldered fuel mixture falls under the force of gravity towards an aperture at the bottom.

Operation of the turntable and collection unit demonstrated that discharge from the turntable spilled over the entire circumference of the turntable and was efficiently collected through the aperture at the bottom of the collection unit. The collection unit was also tested with a stationary scraper positioned to remove smoldered fuel mixture from the edge of the turntable which resulted in discharge from the turntable being localized.

An additional device comprising a separator as shown in FIG. 30 was designed and tested for the removal and collection of smoldered fuel mixture. A separator sieve was positioned below the turntable within the collection unit. The sieve contained perforations that allowed residual ash to pass through the sieve and fall into the bottom of the collection unit, while retaining thermal media on the surface of the sieve. A brush was configured to rotate with the turntable to enhance the separation of residual ash through the sieve and also to direct thermal media towards a separate outlet. The use of a sieve and rotating brush was observed to efficiently separate thermal media from residual ash.

The present disclosure has been described with reference to what are presently considered to be the examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

REFERENCES

1. C. Boschi-Pinto, L. Velebit, and K. Shibuyac. Estimated child mortality due to diarrhoea in developing countries. Bulletin of the World Health Organization, 86:710-717, 2008. Available online at 520 http://www.who.int/bulletin/volumes/86/9/07-050054/en/.
2. Yu-Ling Cheng. A household sanitation process based on integrated diversion/dewatering, drying/smoldering of solid waste, and pasteurization of liquid waste, January 2015. Presentation at FSM3 Conference in Hanoi, Vietnam.
3. M. J. Girovich. Biosolids treatment and management: processes for beneficial use. Taylor & Francis, 1996.
4. C. Lentner and A. Wink. Units of Measurement, Body Fluids, Composition of the Body, Nutrition. Geigy Scientific Tables. CIBA-GEIGY Ltd, Basle, Switzerland, 1981. ISBN 0-914168-50-9.
5. H. G. Lovelady and E. J. Stork. An improved method for preparation of feces for bomb calorimetry. Clin Cheml, 16:253-254, 1970.
6. Andy Peal, Barbara Evans, Isabel Blacket, Peter Hawkins, and Chris Heymans. Fecal sludge management: a comparative analysis of 12 cities. Water Sanitation and Hygiene for Development, 4(4):532 563-575, 2014.
7. Pollution research group, the University of KwaZulu-Natal. Selection of synthetic sludge simulant for the Bill and Melinda Gates Foundation's Reinvent the Toilet fair: India 2014. Technical guide, South Africa.
8. F. R. Spellman. Incinerating biosolids. Taylor & Francis, 1997.
9. Hiroshi Takahashi and Hiroshi Yanai. Flow profile and void fraction of granular solids in a moving bed. Powder Technology, 7:205-214, 1973.
10. L. Yerman, Rory M. Hadden, J. Carrascal, I. Fabris, D. Cormier, J. L. Torero, J. I. Gerhard, M. Krajcovic, P. Pironi, and Yu-Ling Cheng. Smouldering combustion as a treatment technology for faeces: Exploring the parameter space. Fuel, 147:108-116, 2015.
11. L. Yerman, H. Wall, J. L. Torero, J. I. Gerhard, and Y.-L. Cheng. Smouldering combustion as a treatment technology for faeces: Sensitivity to key parameters. Combustion Science and Technology, 188(6), January 2016.
12. Belcher D, Foutch G L, Smay J, Archer C, Buckley C A, Viscous heating effect on deactivation of helminth eggs in ventilated improved pit sludge, Water Science and Technology, 2015; 72(7): 1119-26. Doi: 10.2166/wst.2015.300.
13. Evaluation of sludge treatments for pathogen reduction—Final report; E G Carrington; Report No.: CO 5026/1; European Communities, 2001.

The invention claimed is:

1. A method for treating fecal matter, the method comprising:
    combining fecal matter with a thermal media to produce a fuel mixture, wherein the thermal media comprises granular, non-combustible solid particles;
    smoldering the fuel mixture in a column reactor with a top end and a bottom end to produce a smoldered fuel mixture and a volatile components stream, wherein smoldering is an oxygen-limited exothermic reaction on a surface of the fuel mixture that does not produce a flame in the column reactor and the smoldered fuel mixture comprises residual ash and thermal media; and
    subjecting the volatile components stream to at least one catalytic step in a catalytic conversion reactor to produce an exit stream, wherein the at least one catalytic step comprises contacting the volatile components stream with at least one catalyst for catalytic oxidation of the volatile components stream.

2. The method of claim 1, further comprising removing the smoldered fuel mixture from the column reactor.

3. The method of claim 1, wherein a heater is used to simultaneously heat the fuel mixture in the column reactor to initiate smoldering and heat the catalyst in the catalytic conversion reactor.

4. The method of claim 1, wherein the catalytic conversion reactor further comprises a post-catalysis heat exchanger and heat from the catalytic oxidation is transferred to the fuel mixture above a smoldering zone in the column reactor.

5. The method of claim 1, further comprising introducing auxiliary airflow into the catalytic conversion reactor.

6. The method of claim 1, wherein catalytic oxidation of the volatile components stream converts carbon monoxide, methane and/or higher hydrocarbons into carbon dioxide and water.

7. The method of claim 1, comprising mixing the fecal matter and thermal media within the column reactor to produce the fuel mixture.

8. The method of claim 1, wherein smoldering the fuel mixture occurs in a batch process.

9. The method of claim 1, wherein smoldering the fuel mixture occurs in a continuous or semi-continuous process and smoldered fuel mixture is continuously or intermittently removed from the bottom end of the column reactor and fecal matter, thermal media and/or fuel mixture is continuously or intermittently added to the top end of the column reactor.

10. The method of claim 9, further comprising maintaining the level of a smoldering zone in the column reactor such that the smoldering zone is adjacent to or near the catalyst in the catalytic conversion reactor.

11. A device for treating fecal matter, the device comprising:
    a column reactor for smoldering a fuel mixture comprising fecal matter and thermal media to produce a smoldered fuel mixture comprising residual ash and thermal media, wherein smoldering is an oxygen-limited exothermic reaction on a surface of the fuel mixture that does not produce a flame in the column reactor, the column reactor comprising a top portion having a top end for receiving fecal matter, thermal media and/or fuel mixture and a bottom portion having a bottom end for discharge of smoldered fuel mixture from the column reactor;
    a heater for heating the fuel mixture in the column reactor to initiate smoldering of the fuel mixture;
    a catalytic conversion reactor comprising an inlet for receiving a volatile components stream from the top portion of the column reactor, a catalyst, and an outlet for an exit stream;
    a blower for introducing airflow into the bottom portion of the column reactor and/or auxiliary airflow into the catalytic conversion reactor; and
    a conduit connecting the top portion of the column reactor and the inlet of the catalytic conversion reactor for flow of the volatile components stream from the top portion of the column reactor into the catalytic conversion reactor.

12. The device of claim 11, further comprising a turntable positioned at the bottom end of the column reactor forming a gap between the turntable and the bottom end of the column reactor, wherein rotating the turntable discharges smoldered fuel mixture from the column reactor through the gap.

13. The device of claim 11, further comprising a separator for separating the smoldered fuel mixture into an ash stream and recycled thermal media.

14. The device claim 11, wherein the heater is a band heater adjacent to the catalytic conversion reactor and the column reactor such that the heater simultaneously heats the catalytic conversion reactor and the portion of the column reactor.

15. The device of claim 11, wherein the catalytic conversion reactor further comprises a post-catalysis heat exchanger such that in operation heat from the catalytic conversion reactor is transferred to the top portion of the column reactor.

16. The device of claim 11, wherein the catalyst converts carbon monoxide, methane and/or higher hydrocarbons in the volatile components stream into carbon dioxide and water in the exit stream.

17. The device of claim 11, wherein the catalyst comprises one or more precious metals, metal oxides, base metal oxides, or mixture thereof.

18. The method of claim 1, wherein smoldering the fuel mixture comprises introducing airflow into the bottom end of the column reactor.

19. The method of claim 1, wherein the smoldered fuel mixture is at least 90% thermal media and residual ash.

20. The method of claim 1, wherein smoldering the fuel mixture comprises combustion of char produced by pyrolysis of the fuel mixture above a smoldering zone in the column reactor.

* * * * *